United States Patent
Sanderson et al.

(10) Patent No.: US 10,843,121 B2
(45) Date of Patent: *Nov. 24, 2020

(54) SEPARATION PROCESS AND APPARATUS FOR LIGHT NOBLE GAS

(71) Applicant: Air Products and Chemicals, Inc., Allentown, PA (US)

(72) Inventors: Cory E. Sanderson, Allentown, PA (US); Jason Michael Ploeger, Perkasie, PA (US); Jin Cao, Breinigsville, PA (US); Roger Dean Whitley, Allentown, PA (US); Shubhra Jyoti Bhadra, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/251,594

(22) Filed: Jan. 18, 2019

(65) Prior Publication Data

US 2019/0201835 A1 Jul. 4, 2019

Related U.S. Application Data

(63) Continuation-in-part of application No. 15/850,646, filed on Dec. 21, 2017, now Pat. No. 10,478,770.

(51) Int. Cl.
*B01D 53/04* (2006.01)
*B01D 53/053* (2006.01)
*B01D 53/22* (2006.01)
*C01B 23/00* (2006.01)
*B01D 53/047* (2006.01)

(52) U.S. Cl.
CPC ....... *B01D 53/053* (2013.01); *B01D 53/0438* (2013.01); *B01D 53/0446* (2013.01);
(Continued)

(58) Field of Classification Search
CPC .. B01D 53/04; B01D 53/047; B01D 53/0038; B01D 53/0446; B01D 53/0454;
(Continued)

(56) References Cited

U.S. PATENT DOCUMENTS 3,250,080 A 5/1966 Garwin
3,324,626 A 6/1967 Dresser et al.
(Continued)

FOREIGN PATENT DOCUMENTS

DE 102007022963 A1 11/2008
WO 2016096104 A1 6/2016

OTHER PUBLICATIONS

Sanders, David F., et al, "Energy-efficient polymeric gas separation membranes for a sustainable future: A review", Polymer, 2013, vol. 54, 4729-4761.
(Continued)

*Primary Examiner* — Frank M Lawrence, Jr.
(74) *Attorney, Agent, or Firm* — Amy Carr-Trexler

(57) ABSTRACT

Process and apparatus for producing helium, neon, or argon product gas using an adsorption separation unit having minimal dead end volumes. A purification unit receives a stream enriched in helium, neon, or argon, and a stream is recycled from the purification unit back to the adsorption separation unit in a controlled manner to maintain the concentration of the helium, neon, or argon in the feed to the separation unit within a targeted range.

28 Claims, 8 Drawing Sheets

(52) U.S. Cl.
CPC ..... *B01D 53/0454* (2013.01); *B01D 53/0473* (2013.01); *B01D 53/0476* (2013.01); *B01D 53/229* (2013.01); *C01B 23/0042* (2013.01); *B01D 2253/102* (2013.01); *B01D 2256/18* (2013.01); *B01D 2257/11* (2013.01); *B01D 2259/40009* (2013.01); *B01D 2259/4061* (2013.01); *C01B 2210/0031* (2013.01); *C01B 2210/0032* (2013.01); *C01B 2210/0046* (2013.01)

(58) Field of Classification Search
CPC .............. B01D 53/0476; B01D 53/053; B01D 53/029; B01D 53/0473; B01D 2253/102; B01D 2256/18; B01D 2257/11; B01D 2259/40009; B01D 2259/4061; C01B 23/00; C01B 23/0052; C01B 2210/0014; C01B 2210/0031; C01B 2210/0032; F25J 3/0295; F25J 2205/64; F25J 2210/58; F25J 2280/50
USPC ...... 95/8, 12, 43, 53, 90, 96, 113; 96/4, 111, 96/131, 108, 121, 134
See application file for complete search history.

(56) References Cited

U.S. PATENT DOCUMENTS

| | | | |
|---|---|---|---|
| 3,944,400 A | 3/1976 | Bird | |
| 4,077,779 A | 3/1978 | Sircar et al. | |
| 4,690,695 A | 9/1987 | Doshi | |
| 4,701,187 A | 10/1987 | Choe et al. | |
| 4,717,407 A | 1/1988 | Choe et al. | |
| 4,783,203 A | 11/1988 | Doshi | |
| 4,913,709 A | 4/1990 | Kumar | |
| 5,080,694 A | 1/1992 | Knoblauch et al. | |
| 5,089,048 A | 2/1992 | Knoblauch et al. | |
| 5,542,966 A | 8/1996 | D'Amico et al. | |
| 5,632,803 A | 5/1997 | Stoner et al. | |
| 7,740,687 B2 | 6/2010 | Reinhold, III | |
| 8,152,898 B2 | 4/2012 | Prasad et al. | |
| 8,268,047 B2 | 9/2012 | Allie | |
| 9,381,460 B2 | 7/2016 | Weist, Jr. et al. | |
| 9,675,925 B2 | 6/2017 | Ramkumar et al. | |
| 10,478,770 B2 * | 11/2019 | Sanderson | B01D 53/226 |
| 2010/0101410 A1 * | 4/2010 | Prasad | C01B 3/0015 95/53 |
| 2017/0312682 A1 | 11/2017 | Keller et al. | |

OTHER PUBLICATIONS

U.S. Appl. No. 16/102,936, filed Aug. 14, 2018 entitled Port Separation for Rotary Bed PSA.

U.S. Appl. No. 16/103,569, filed Aug. 14, 2018 entitled Multi-Bed Rapid Cycle Kinetic PSA.

* cited by examiner

| P | R | BD | EV | PP |
|---|---|----|----|----|
| PP | P | R | BD | EV |
| EV | PP | P | R | BD |
| BD | EV | PP | P | R |
| R | BD | EV | PP | P |

FIG. 3

SEPARATION PROCESS AND APPARATUS FOR LIGHT NOBLE GAS

CROSS-REFERENCE TO RELATED APPLICATIONS

This application is a continuation-in-part of, and claims the priority of, U.S. patent application Ser. No. 15/850,646 filed Dec. 21, 2017, which is incorporated by reference herein in its entirety.

BACKGROUND

The present disclosure relates to the recovery of a light noble gas from a gas mixture containing the light noble gas and at least one other component. The light noble gas may be helium, neon, or argon.

A variety of processes and techniques have been developed to separate and recover light noble gases from multi-component gas streams. Such processes include stand-alone membrane separation units, stand-alone adsorption units, stand-alone cryogenic units, and combinations of membrane separation units, cryogenic units, and pressure swing adsorption (PSA) units. As used herein, the term "pressure swing adsorption" includes "vacuum swing adsorption" and "vacuum pressure swing adsorption."

Disclosures related to such processes and/or techniques include WO2016/096104; DE102007022963; and U.S. Pat. Nos. 3,250,080; 3,324,626; 4,077,779; 4,690,695; 4,701,187; 4,717,407; 4,783,203; 5,542,966; 8,152,898; 8,268,047; and US App. Pub. No. 2017/0312682; and U.S. application Ser. Nos. 16/102,936 and 16/103,569, both filed Aug. 14, 2018.

It is desirable in the industry to recover light noble gases from various feed streams that contain the desired light noble gas.

For example, it is desirable to recover helium from a feed stream (e.g. natural gas) having a low helium concentration, e.g. from 0.1 mole % to 4 mole % or from 0.1 mole % to 2 mole % helium, or from 0.1 mole % to 1 mole % helium. Other example feed streams include nitrogen rejection unit (NRU) vent streams, gas streams that boil off or flash from liquefied natural gas processes, $CO_2$ liquefaction vent streams, recycle streams in manufacturing processes, recovery streams in airship filling processes, reboiler non-condensable vents in air separation units, high pressure gaseous nitrogen (HPGAN) from air separation units, reflux to low pressure columns in air separation units, or liquefied nitrogen storage tank vents.

It is desirable in the industry to recover light noble gases from a feed streams where the concentration of the light noble gas varies over time.

It is also desirable in the industry to produce a product gas containing a light noble gas within target concentration specifications for feed streams where the concentration of the light noble gas varies.

BRIEF SUMMARY

The present invention relates to a process and apparatus for separating a light noble gas from a feed gas stream comprising the light noble gas and at least one other component.

There are several aspects of the invention as outlined below. In the following, the reference numbers and expressions set in parentheses are referring to an example embodiment explained further below with reference to the figures. The reference numbers and expressions are, however, only illustrative and do not limit the aspect to any specific component or feature of the example embodiment. Components and features of any embodiment may be combined with one or more components or features from one or more other embodiments, and all such combinations are considered to be within the scope of the present invention. The aspects can be formulated as claims in which the reference numbers and expressions set in parentheses are omitted or replaced by others as appropriate.

Aspect 1. An apparatus for producing a light noble gas-rich product stream (25) from a feed gas (11) comprising a light noble gas and at least one other gaseous component, the light noble gas selected from the group consisting of helium, neon, and argon, the apparatus comprising:

an adsorption separation unit (10), wherein the adsorption separation unit (10) comprises a plurality of vessels (100a, 100b, 100c, 100d, 100e) each containing a bed of adsorbent;

a feed gas header (200) in selective fluid communication with each of the plurality of vessels (100a, 100b, 100c, 100d, 100e);

a product gas header (210) in selective fluid communication with each of the plurality of vessels (100a, 100b, 100c, 100d, 100e);

a tail gas header (220) in selective fluid communication with each of the plurality of vessels (100a, 100b, 100c, 100d, 100e);

process gas transfer lines operatively connecting the plurality of vessels (100a, 100b, 100c, 100d, 100e) to the feed gas header (200), the product gas header (210), and the tail gas header (220);

each vessel (100) of the plurality of vessels (100a, 100b, 100c, 100d, 100e) having process gas transfer lines associated therewith (101, 102, 103, 104, 105, 106, 107, 108);

a plurality of valves in the process gas transfer lines including a plurality of valves adjacent and associated (110, 111, 112, 113, 114, 115) with each respective vessel (100);

wherein the adsorption separation unit (10) has a central volume, $V_c$, of process gas transfer lines (101, 102, 103, 104, 105, 106, 107, 108) associated with each of the respective vessels (100);

wherein the central volume for each respective vessel is the sum of (i) the volume contained in the process gas transfer lines associated with the respective vessel connecting the respective vessel to each valve adjacent (110, 111, 112, 113, 114, 115) the respective vessel (100), (ii) all dead-end volumes (109), if any, connected at a junction to the respective vessel (100), and (iii) all dead-end volumes, if any, connected at a junction to any of the process gas transfer lines associated with the respective vessel (100) that connect the respective vessel (100) to any valve adjacent (110, 111, 112, 113, 114, 115) to the respective vessel (100);

wherein the central volume for each respective vessel includes a secondary volume, $V_2$, where the secondary volume is the sum of (i) the volume of all dead-end volumes (109), if any, connected to the respective vessel (100);

(ii) the volume of all dead-end volumes, if any, connected at a junction to any of the process gas transfer lines associated with the respective vessel (100) that connect the respective vessel (100) to any valve adjacent (110, 111, 112, 113, 114, 115) the respective vessel (100), and (iii) the volume of any process gas transfer lines (108), if any, having a first end terminating in a valve adjacent (115) the respective vessel (100) that is configured to permit transfer of process gas to the tail gas header (220) when open and having a second end terminating at a junction to any other of the associated process gas transfer lines (102) that connect the respective vessel (100) to any other valve adjacent (110) to the respective vessel (100); and wherein the secondary volume $V_2$ is less than 5%, or less than 3%, or less than 1% of the central volume, $V_c$, for each vessel (100).

Aspect 2. The apparatus according to aspect 1 further comprising:

a purification unit (20), the purification unit (20) having an inlet, a first outlet, and a second outlet, the inlet in fluid communication with the product gas header (210) of the adsorption separation unit (10);

a gas mixer (60) having a first inlet for receiving a stream of the feed gas (11), a second inlet in fluid communication with a source of a second gas (17) having a higher light noble gas concentration than the feed gas (11), wherein the feed gas header (200) of the adsorption separation unit (10) is in downstream fluid communication with the outlet of the gas mixer (60);

a sensor (50) in at least one of (i) a process gas transfer line (11) supplying the first inlet of the gas mixer (60), (ii) a process gas transfer line (12) connecting the outlet of the gas mixer (60) to the feed gas header (200) of the adsorption separation unit (10), and (iii) the feed gas header (200); and a controller (80) in signal communication with the sensor (50), the controller (80) operable to control the flow rate of light noble gas from the source of the second gas (17) to the second inlet of the gas mixer (60) responsive to signals from the sensor (50).

Aspect 3. An apparatus for producing a light noble gas-rich product stream (25) from a feed gas (11) comprising a light noble gas and at least one other gaseous component, the light noble gas selected from the group consisting of helium, neon, and argon, the apparatus comprising:

a feed membrane separation unit (85) having an inlet for receiving a feed gas stream (11), a permeate outlet, and a non-permeate outlet;

an adsorption separation unit (10), wherein the adsorption separation unit (10) comprises a plurality of vessels (100a, 100b, 100c, 100d, 100e) each containing a bed of adsorbent;

a feed gas header (200) in selective fluid communication with each of the plurality of vessels (100a, 100b, 100c, 100d, 100e);

a product gas header (210) in selective fluid communication with each of the plurality of vessels (100a, 100b, 100c, 100d, 100e);

a tail gas header (220) in selective fluid communication with each of the plurality of vessels (100a, 100b, 100c, 100d, 100e);

process gas transfer lines operatively connecting the plurality of vessels (100a, 100b, 100c, 100d, 100e) to the feed gas header (200), the product gas header (210), and the tail gas header (220);

each vessel (100) of the plurality of vessels (100a, 100b, 100c, 100d, 100e) having process gas transfer lines associated therewith (101, 102, 103, 104, 105, 106, 107, 108);

a plurality of valves in the process gas transfer lines including a plurality of valves adjacent and associated (110, 111, 112, 113, 114, 115) with each respective vessel (100);

wherein the adsorption separation unit (10) has a central volume, $V_c$, of process gas transfer lines (101, 102, 103, 104, 105, 106, 107, 108) associated with each of the respective vessels (100);

wherein the central volume for each respective vessel is the sum of (i) the volume contained in the process gas transfer lines associated with the respective vessel connecting the respective vessel to each valve adjacent (110, 111, 112, 113, 114, 115) the respective vessel (100), (ii) all dead-end volumes (109), if any, connected at a junction to the respective vessel (100), and (iii) all dead-end volumes, if any, connected at a junction to any of the process gas transfer lines associated with the respective vessel (100) that connect the respective vessel (100) to any valve adjacent (110, 111, 112, 113, 114, 115) to the respective vessel (100);

wherein the central volume for each respective vessel includes a secondary volume, $V_2$, where the secondary volume is the sum of (i) the volume of all dead-end volumes (109), if any, connected to the respective vessel (100);

(ii) the volume of all dead-end volumes, if any, connected at a junction to any of the process gas transfer lines associated with the respective vessel (100) that connect the respective vessel (100) to any valve adjacent (110, 111, 112, 113, 114, 115) the respective vessel (100), and (iii) the volume of any process gas transfer lines (108), if any, having a first end terminating in a valve adjacent (115) the respective vessel (100) that is configured to permit transfer of process gas to the tail gas header (220) when open and having a second end terminating at a junction to any other of the associated process gas transfer lines (102) that connect the respective vessel (100) to any other valve adjacent (110) to the respective vessel (100); and wherein the secondary volume $V_2$ is less than 5%, or less than 3%, or less than 1% of the central volume, $V_c$, for each vessel (100); and a conduit system for transferring a permeate stream (41) from the permeate outlet to the feed gas header of the adsorption separation unit.

Aspect 4. The apparatus according to aspect 3 further comprising:

a purification unit (20), the purification unit (20) having an inlet, a first outlet, and a second outlet, the inlet in fluid communication with the product gas header (210) of the adsorption separation unit (10);

wherein the conduit system comprises a gas mixer (60) having a first inlet for receiving the permeate stream (41), a second inlet in fluid communication with a source of a second gas (17) having a higher light noble gas concentration than the permeate gas (41), and an outlet in fluid communication with a combined gas stream (12), wherein the feed gas header (200) of the adsorption separation unit (10) is in downstream fluid communication with the outlet of the gas mixer (60);

a sensor (50) in at least one of (i) a feed gas line (11) supplying the inlet of the feed membrane separation unit (85), (ii) a permeate stream line (41) connecting the permeate outlet of the feed membrane separation unit to the first inlet of the gas mixer (60), (iii) a combined gas stream line (12) connecting the outlet of the gas mixer (60) to the feed gas header (200) of the adsorption separation unit (10), and (iv) the feed gas header (200); and a controller (80) in signal communication with the sensor (50), the controller (80) operable to control the flow rate of light noble gas from the source of the second gas (17) to the second inlet of the gas mixer (60) responsive to signals from the sensor (50).

Aspect 5. The apparatus according to aspect 2 or 4 wherein the purification unit (20) is an adsorption-type separation unit, a membrane-type separation unit, or a distillation-type separation unit.

Aspect 6. The apparatus according to aspect 2 or aspects 4 to 5 wherein the source of the second gas (17) comprises the first outlet of the purification unit (20).

Aspect 7. The apparatus according to aspect 6 further comprising a flow regulator (27) operatively disposed between the second inlet of the gas mixer (60) and the first outlet of the purification unit (20) and in signal communication with the controller (80);

wherein the controller (80) is operable to control the flow rate of light noble gas from the source of the second gas (17) to the second inlet of the gas mixer (60) by adjusting the flow regulator (27) operatively disposed between the second inlet of the gas mixture (60) and the first outlet of the purification unit (20).

Aspect 8. The apparatus according to any one of aspect 2 or aspects 4 to 7 wherein the source of the second gas (17) comprises the second outlet of the purification unit (20).

Aspect 9. The apparatus according to aspect 8 further comprising a flow regulator (29) operatively disposed between the second inlet of the gas mixer (60) and the second outlet of the purification unit (20) and in signal communication with the controller (80);

wherein the controller (80) is operable to control the flow rate of the light noble gas from the source of the second gas (17) to the second inlet of the gas mixer (60) by adjusting the flow regulator (29) operatively disposed between the second inlet of the gas mixer (60) and the second outlet of the purification unit (20).

Aspect 10. The apparatus according to any one of aspect 2 or aspects 4 to 9 wherein the source of the second gas (17) comprises a process gas transfer line (36) which operatively connects the product gas header (210) to the inlet to the purification unit (20).

Aspect 11. The apparatus according to aspect 10 further comprising a flow regulator (33) operatively disposed between the second inlet of the gas mixer (60) and the process gas transfer line (36) which operatively connects the product gas header (210) of the adsorption separation unit (10) to the inlet of the purification unit (20) and in signal communication with the controller (80);

wherein the controller (80) is operable to control the flow rate of the light noble gas from the source of the second gas (17) to the second inlet of the gas mixer (60) by adjusting the flow regulator (33) operatively disposed between the second inlet of the gas mixer (60) and the process gas transfer line which operatively connects the product gas header (210) of the adsorption separation unit (10) to the inlet of the purification unit (20).

Aspect 12. The apparatus according to any one of aspect 2 or aspects 4 to 11 wherein the gas mixer (60) has a third inlet in fluid communication with the second outlet of the purification unit (20).

Aspect 13. The apparatus according to aspect 12 further comprising a flow regulator (31) operatively disposed between the third inlet of the gas mixer (60) and the second outlet of the purification unit (20) and in signal communication with the controller (80);

wherein the controller (80) is operable to adjust the flow regulator (31) operatively disposed between the third inlet of the gas mixer (60) and the second outlet of the purification unit (20) responsive to signals from the sensor (50).

Aspect 14. The apparatus according to any one of aspect 2 or aspects 4 to 13 wherein the gas mixer (60) has a third inlet in fluid communication with a process gas transfer line (36) which operatively connects the product gas header (210) of the adsorption separation unit (10) to the inlet to the purification unit (20).

Aspect 15. The apparatus according to aspect 14 further comprising a flow regulator (37) operatively disposed between the third inlet of the gas mixer (60) and the process gas transfer line (36) which operatively connects the product gas header (210) of the adsorption separation unit (10) to the inlet to the purification unit (20) and in signal communication with the controller (80);

wherein the controller (80) is operable to adjust the flow regulator (37) operatively disposed between the third inlet of the gas mixer (60) and the process gas transfer line which operatively connects the product gas header (210) of the adsorption separation unit (10) to the inlet to the purification unit (20) responsive to signals from the sensor (50).

Aspect 16. The apparatus according to any one of aspect 2 or aspects 4 to 15 wherein the purification unit (20) is a membrane-type separation unit, wherein the source of the second gas (17) comprises the first outlet of the purification unit (20);

wherein the purification unit (20) comprises one or more adjustable orifices (26) in signal communication with the controller (80), the one or more adjustable orifices (26) operative to control a pressure in the purification unit (20); and wherein the controller (80) is operable to control the flow rate of light noble gas from the source of the second gas (17) to the second inlet of the gas mixer (60) by adjusting the one or more adjustable orifices (26).

Aspect 17. The apparatus according to any one of aspect 2 or aspects 4 to 16 wherein the purification unit (20) is a membrane-type separation unit, wherein the source of the second gas (17) comprises the first outlet of the purification unit (20);

wherein the membrane-type separation unit comprises a plurality of membrane modules and one or more control valves that control the fraction of membrane modules on-stream, the one or more control valves in signal communication with the controller (80);

wherein the controller (80) is operable to control the flow rate of light noble gas from the source of the second gas (17) to the second inlet of the gas mixer (60) by adjusting the fraction of membrane modules on-stream.

Aspect 18. The apparatus according to any one of aspect 2 or aspects 4 to 17 wherein the purification unit (20) is a membrane-type separation unit, wherein the source of the second gas (17) comprises the first outlet of the purification unit (20), the apparatus further comprising a heat exchanger (40) operative to control a temperature in the purification unit, the heat exchanger in signal communication with the controller (80);

wherein the controller (80) is operable to control the flow rate of light noble gas from the source of the second gas (17) to the second inlet of the gas mixer (60) by adjusting the heat duty of the heat exchanger (40).

Aspect 19. The apparatus according to any one of aspect 2 or aspects 4 to 15 wherein the purification unit (20) is an adsorption-type separation unit, wherein the adsorption-type separation unit comprises a plurality of vessels each containing a bed of adsorbent, and one or more control valves that control the fraction of the plurality of vessels on-stream, the one or more control valves in signal communication with the controller (80);

wherein the source of the second gas comprises the first outlet of the purification unit;

wherein the controller (80) is operable to control the flow rate of light noble gas from the source of the second gas (17) to the second inlet of the gas mixer (60) by adjusting the fraction of the plurality of vessels on-stream.

Aspect 20. The apparatus according to any one of aspect 2, aspects 4 to 15 or aspect 19 wherein the purification unit (20) is an adsorption-type separation unit, wherein the source of the second gas comprises the first outlet of the purification unit;

wherein the purification unit (20) comprises a feed gas header, wherein the purification unit (20) comprises one or more adjustable orifices (32) operative to control a pressure in the feed gas header of the purification unit (20); and wherein the controller (80) is operable to control the flow rate of light noble gas from the source of the second gas (17) to the second inlet of the gas mixer (60) by adjusting the one or more adjustable orifices (32) operative to control the pressure in the feed gas header of the purification unit (20).

Aspect 21. The apparatus according to any one of aspect 2, aspects 4 to 15 or aspects 19 to 20 wherein the purification unit (20) is an adsorption-type separation unit, wherein the source of the second gas comprises the first outlet of the purification unit;

wherein the purification unit (20) comprises a tail gas header, wherein the purification unit (20) comprises one or more adjustable orifices (27) operative to control a pressure in the tail gas header of the purification unit (20); and wherein the controller (80) is operable to control the flow rate of light noble gas from the source of the second gas (17) to the second inlet of the gas mixer (60) by adjusting the one or more adjustable orifices (27) operative to control the pressure in the tail gas header of the purification unit (20).

Aspect 22. The apparatus according to any one of aspect 2, aspects 4 to 15 or aspects 19 to 21 wherein the purification unit (20) is an adsorption-type separation unit, wherein the source of the second gas comprises the second outlet of the purification unit;

wherein the purification unit (20) comprises a product gas header, wherein the purification unit (20) comprises one or more adjustable orifices (26) operative to control a pressure in the product gas header of the purification unit (20); and wherein the controller (80) is operable to control the flow rate of light noble gas from the source of the second gas (17) to the second inlet of the gas mixer (60) by adjusting the one or more adjustable orifices (26) operative to control the pressure in the product gas header of the purification unit (20).

Aspect 23. The apparatus according to any one of aspect 2, aspects 4 to 15 or aspects 19 to 22 wherein the purification unit (20) is an adsorption-type separation unit, wherein the source of the second gas comprises the second outlet of the purification unit; and wherein the apparatus further comprises a heat exchanger (40) operative to control a temperature in the purification unit (20), wherein the heat exchanger (40) is in signal communication with the controller (80); and wherein the controller (80) is operable to control the flow rate of light noble gas from the source of the second gas (17) to the second inlet of the gas mixer (60) by adjusting the duty of the heat exchanger (40) to control the temperature in the purification unit (20).

Aspect 24. The apparatus according to any one of aspect 2, aspects 4 to 15 or aspects 19 to 23 wherein the purification unit (20) is a rapid cycle adsorption unit.

Aspect 25. The apparatus according to aspect 24 wherein the rapid cycle adsorption unit comprises one or more rotary valves.

Aspect 26. The apparatus according to aspects 24 to 25 wherein the rapid cycle adsorption unit comprises a rotor assembly and first and second stator assemblies, wherein:

the rotor assembly is positioned between the first and second stator assemblies and comprises a plurality of adsorption beds each bed having a rotor port at either end of the bed via which gas enters or exits said bed;

the first stator assembly comprises at least one feed port, at least one exhaust port and a first stator plate having at least one feed slot for directing at least one feed gas stream from the feed port(s) into any of the rotor ports that are in alignment with the slot and at least one exhaust slot for directing flow of exhaust gas streams from any of the rotor ports that are in alignment with the slot to the exhaust port(s);

the second stator assembly comprises at least one product port and a second stator plate having at least one product slot for directing flow of at least one product gas stream between the product port(s) and any of the rotor ports that are in alignment with the slot and at least one purge slot for directing flow of at least one purge gas stream into any of the rotor ports that are in alignment with the slot; and the rotor assembly being rotatable relative to the first and second stator assemblies so as to change the operating modes of individual adsorption beds by changing which rotor ports are in alignment with which slots in the first and second stator plates.

Aspect 27. The apparatus according to any one of aspects 24 to 26 wherein the rapid cycle adsorption unit comprises 6 to 9 beds each comprising a bed of adsorbent.

Aspect 28. The apparatus according to any one of aspect 2 or aspects 4 to 15 wherein the purification unit (20) is a distillation-type separation unit,
- wherein the source of the second gas comprises the first outlet of the purification unit (20);
- wherein the purification unit comprises one or more adjustable orifices (26, 27, 32) in signal communication with the controller (80), the one or more adjustable orifices (26, 27, 32) operative to control a pressure in the purification unit (20);
- wherein the controller (80) is operable to control the flow rate of light noble gas from the source of the second gas (17) to the second inlet of the gas mixer (60) by adjusting the one or more adjustable orifices (26, 27, 32) operative to control the pressure in the purification unit (20).

Aspect 29. The apparatus according to any one of aspect 2, aspects 4 to 15 or aspect 28 wherein the purification unit (20) is a distillation-type separation unit,
- wherein the source of the second gas comprises the first outlet of the purification unit (20);
- the apparatus further comprising a heat exchanger (40) operative to control a temperature in the purification unit, the heat exchanger in signal communication with the controller (80);
- wherein the controller (80) is operable to control the flow rate of light noble gas from the source of the second gas (17) to the second inlet of the gas mixer (60) by adjusting the heat duty of the heat exchanger (40).

Aspect 30. The apparatus according to any one of aspect 2, aspects 4 to 15 or aspects 28 to 29 wherein the purification unit (20) is a distillation-type separation unit,
- wherein the source of the second gas comprises the first outlet of the purification unit (20);
- wherein the purification unit (20) comprises one or more orifices operative to control a reflux ratio in the purification unit (20); and
- wherein the controller (80) is operable to control the flow rate of light noble gas from the source of the second gas (17) to the second inlet of the gas mixer (60) by adjusting the reflux ratio in the purification unit (20).

Aspect 31. The apparatus according to any one of aspect 2, aspects 4 to 15 or aspects 28 to 30 wherein the purification unit (20) is a distillation-type separation unit,
- wherein the source of the second gas comprises the first outlet of the purification unit (20);
- wherein the purification unit (20) comprises one or more orifices operative to control a distillate to feed ratio in the purification unit (20); and
- wherein the controller (80) is operable to control the flow rate of light noble gas from the source of the second gas (17) to the second inlet of the gas mixer (60) by adjusting the distillate to feed ratio in the purification unit (20).

Aspect 32. The apparatus according to any one of aspect 2, aspects 4 to 15 or aspects 28 to 31 wherein the purification unit (20) is a distillation-type separation unit,
- wherein the source of the second gas comprises the first outlet of the purification unit (20);
- wherein the purification unit (20) comprises one or more orifices operative to control a product to feed ratio in the purification unit (20); and
- wherein the controller (80) is operable to control the flow rate of light noble gas from the source of the second gas (17) to the second inlet of the gas mixer (60) by adjusting the distillate to feed ratio in the purification unit (20).

Aspect 33. A process for separating a feed gas stream (11) comprising a light noble gas and at least one other gaseous component into a light noble gas-rich product stream (25) and a light noble gas-lean product stream (14), the light noble gas selected from the group consisting of helium, neon, and argon, the process comprising:
- combining the feed gas stream (11) with a second gas stream (17) to form a combined gas stream (12), the second gas stream (17) having a higher light noble gas content than the feed gas stream (11), the second gas stream (17) having a flow rate that is regulated;
- separating an adsorption separation unit feed gas stream (15) in an adsorption separation unit (10) to produce a light noble gas-enriched intermediate stream (13) and a tail gas stream (51), wherein the light noble gas-lean product stream (14) comprises at least a portion of the tail gas stream (51), wherein the adsorption separation unit feed gas stream (15) comprises at least a portion of the combined gas stream (12); and
- separating a purification unit feed gas stream (21) in a purification unit (20) to produce the light noble gas-rich product stream (25) and a light noble gas-depleted intermediate stream (23), wherein said purification unit feed gas stream (21) comprises at least a portion of the light noble gas-enriched intermediate stream (13) from the adsorption separation unit (10);
- wherein the flow rate of the light noble gas in the second gas stream (17) is controlled responsive to a measure of the light noble gas content in at least one of the feed gas stream (11), the combined gas stream (12), or the adsorption separation unit feed gas stream (15).

Aspect 34. A process for separating a feed gas stream (11) comprising a light noble gas and at least one other gaseous component into a light noble gas-rich product stream (25) and a light noble gas-lean product stream (14), the light noble gas selected from the group consisting of helium, neon, and argon, the process comprising:
- separating the feed gas stream (11) in a feed membrane separation unit (85) to produce a permeate stream (41) and a non-permeate stream (42);
- combining said permeate stream (41) with a second gas stream (17) to form a combined gas stream (12), the second gas stream (17) having a higher light noble gas content than the permeate stream (41), the second gas stream (17) having a flow rate that is regulated;
- separating an adsorption separation unit feed gas stream (15) in an adsorption separation unit (10) to produce a light noble gas-enriched intermediate stream (13) and a tail gas stream (51), wherein the light noble gas-lean product stream (14) comprises at least a portion of the tail gas stream (51), wherein the adsorption separation unit feed gas stream (15) comprises at least a portion of the combined gas stream (12); and
- separating a purification unit feed gas stream (21) in a purification unit (20) to produce the light noble gas-rich product stream (25) and a light noble gas-depleted intermediate stream (23), wherein said purification unit feed gas stream (21) comprises at least a portion of the light noble gas-enriched intermediate stream (13) from the adsorption separation unit (10);
- wherein the flow rate of the light noble gas in the second gas stream (17) is controlled responsive to a measure of the light noble gas content in at least one of the feed gas stream (11), the permeate stream (41), the combined gas stream (12), or the adsorption separation unit feed gas stream (15).

Aspect 35. The process according to aspect 31 to 34 wherein the adsorption separation unit (10) comprises:
- a plurality of vessels (100a, 100b, 100c, 100d, 100e) each containing a bed of adsorbent;
- a feed gas header (200) in selective fluid communication with each of the plurality of vessels (100a, 100b, 100c, 100d, 100e);
- a product gas header (210) in selective fluid communication with each of the plurality of vessels (100a, 100b, 100c, 100d, 100e);
- a tail gas header (220) in selective fluid communication with each of the plurality of vessels (100a, 100b, 100c, 100d, 100e);
- process gas transfer lines operatively connecting the plurality of vessels (100a, 100b, 100c, 100d, 100e) to the feed gas header (200), the product gas header (210), and the tail gas header (220);
- each vessel (100) of the plurality of vessels (100a, 100b, 100c, 100d, 100e) having process gas transfer lines associated therewith (101, 102, 103, 104, 105, 106, 107, 108);
- a plurality of valves in the process gas transfer lines including a plurality of valves adjacent and associated (110, 111, 112, 113, 114, 115) with each respective vessel (100);
- wherein the adsorption separation unit (10) has a central volume, $V_c$, of process gas transfer lines (101, 102, 103, 104, 105, 106, 107, 108) associated with each of the respective vessels (100),
- wherein the central volume for each respective vessel is the sum of
  (i) the volume contained in the process gas transfer lines associated with the respective vessel connecting the respective vessel to each valve adjacent (110, 111, 112, 113, 114, 115) the respective vessel (100),
  (ii) all dead-end volumes (109), if any, connected at a junction to the respective vessel (100), and
  (iii) all dead-end volumes, if any, connected at a junction to any of the process gas transfer lines associated with the respective vessel (100) that connect the respective vessel (100) to any valve adjacent (110, 111, 112, 113, 114, 115) to the respective vessel (100);
- wherein the central volume for each respective vessel includes a secondary volume, $V_2$, where the secondary volume is the sum of
  (i) the volume of all dead-end volumes (109), if any, connected to the respective vessel (100);
  (ii) the volume of all dead-end volumes, if any, connected at a junction to any of the process gas transfer lines associated with the respective vessel (100) that connect the respective vessel (100) to any valve adjacent (110, 111, 112, 113, 114, 115) the respective vessel (100), and
  (iii) the volume of any process gas transfer lines (108), if any, having a first end terminating in a valve adjacent (115) the respective vessel (100) that is configured to permit transfer of process gas to the tail gas header (220) when open and having a second end terminating at a junction to any other of the associated process gas transfer lines (102) that connect the respective vessel (100) to any other valve adjacent (110) to the respective vessel (100); and wherein the secondary volume, $V_2$, is less than 5% or less than 3% or less than 1% of the central volume, $V_c$, for each vessel (100).

Aspect 36. The process according to any of aspects 31 to 35 where the feed gas stream (11) has a total gas molar flow rate, $F_1$, with a molar flow rate of light noble gas, $F_{1,Noble}$, and the second gas stream (17) has a total gas molar flow rate, $F_2$, with a molar flow rate of light noble gas, $F_{2,Noble}$, and wherein $$\frac{F_{2,Noble}}{F_{1,Noble}} \geq 1.$$

Aspect 37. The process according to any one of aspects 31 to 36 wherein the purification unit (20) is an adsorption-type separation unit, a membrane-type separation unit, or a distillation-type separation unit.

Aspect 38. The process according to any one of aspects 31 to 37
- wherein the flow rate of light noble gas in the second gas stream (17) is increased if the light noble gas content is less than a desired lower limit; and/or
- wherein the flow rate of light noble gas in the second gas stream (17) is decreased if the light noble gas content is greater than a desired upper limit.

Aspect 39. The process according to any one of aspects 31 to 38 wherein the second gas stream (17) comprises the light noble gas-depleted intermediate stream (23), and wherein the flow rate of light noble gas in the second stream (17) is increased or decreased by controlling operating conditions of the purification unit (20) in response to the light noble gas content.

Aspect 40. The process according to aspect 39 wherein the purification unit (20) is a membrane-type separation unit and wherein controlling operating conditions of the purification unit (20) comprises
- decreasing the pressure difference between the purification unit feed gas stream (21) and the light noble gas-rich product stream (25) to increase the flow rate of light noble gas in the light noble gas-depleted intermediate stream (23); and/or
- increasing the pressure difference between the purification unit feed gas stream (21) and the light noble gas-rich product stream (25) to decrease the flow rate of light noble gas in the light noble gas-depleted intermediate stream (23).

Aspect 41. The process according to aspect 39 or aspect 40 wherein the purification unit (20) is a membrane-type separation unit comprising a plurality of membrane modules, and wherein controlling operating conditions of the purification unit (20) comprises
- decreasing the number of membrane modules on-stream to increase the flow rate of light noble gas in the light noble gas-depleted intermediate stream (23); and/or
- increasing the number of membrane modules on-stream to decrease the flow rate of light noble gas in the light noble gas-depleted intermediate stream (23).

Aspect 42. The process according to any one of aspects 39 to 41 wherein the purification unit (20) is a membrane-type separation unit, and wherein controlling operating conditions of the purification unit (20) comprises
- increasing the temperature of the purification unit feed gas stream (21) to decrease the flow rate of light noble gas in the light noble gas-depleted intermediate stream (23); and/or decreasing the temperature of the purification unit feed gas stream (21) to increase the flow rate of light noble gas in the light noble gas-depleted intermediate stream (23).

Aspect 43. The process according to aspect 39 wherein the purification unit (20) is an adsorption-type separation unit operating with an adsorption cycle having a cycle time, and wherein controlling operating conditions of the purification unit (20) comprises increasing the cycle time of the purification unit (20) to decrease the flow rate of light noble gas in the light noble gas-depleted intermediate stream (23); and/or decreasing the cycle time of the purification unit (20) to increase the flow rate of light noble gas in the light noble gas-depleted intermediate stream (23).

Aspect 44. The process according to aspect 39 or 43 wherein the purification unit (20) is an adsorption-type separation unit having a feed gas header and wherein controlling operating conditions of the purification unit (20) comprises increasing the pressure of the purification unit feed gas stream (21) in the feed gas header of the purification unit (20) to decrease the flow rate of the light noble gas in the light noble gas-depleted intermediate stream (23); and/or decreasing the pressure of the purification unit feed gas stream (21) in the feed gas header of the purification unit (20) to increase the flow rate of the light noble gas in the light noble gas-depleted intermediate stream (23).

Aspect 45. The process according to any one of aspects 39, 43, or 44 wherein the purification unit (20) is an adsorption-type separation unit having a tail gas header and wherein controlling operating conditions of the purification unit (20) comprises increasing the pressure of the light noble gas-depleted intermediate stream (23) in the tail gas header of the purification unit (20) to increase the flow rate of the light noble gas in the light noble gas-depleted intermediate stream (23); and/or decreasing the pressure of the light noble gas-depleted intermediate stream (23) in the tail gas header of the purification unit (20) to decrease the flow rate of the light noble gas in the light noble gas-depleted intermediate stream (23).

Aspect 46. The process according to any one of aspects 39, or 43 to 45 wherein the purification unit (20) is an adsorption-type separation unit operating with an adsorption cycle comprising a blowdown step having a target pressure for the end of the blowdown step, where a blowdown gas stream is formed during the blowdown step and wherein controlling operating conditions of the purification unit (20) comprises increasing the target pressure for the end of the blowdown step to increase the flow rate of the light noble gas in the light noble gas-depleted intermediate stream (23); and/or decreasing the target pressure for the end of the blowdown step to decrease the flow rate of the light noble gas in the light noble gas-depleted intermediate stream (23).

Aspect 47. The process according to any one of aspects 39, or 43 to 46 wherein the purification unit (20) is an adsorption-type separation unit comprising a plurality of adsorption beds and operating with a plurality of adsorption cycles each comprising a feed step, wherein controlling the operating conditions of the purification unit (20) comprises:

changing to an adsorption cycle having fewer adsorption beds simultaneously on the feed step to increase the flow rate of light noble gas in the light noble gas-depleted intermediate stream (23); and/or changing to an adsorption cycle having a greater number of adsorption beds simultaneously on the feed step to increase the flow rate of light noble gas in the light noble gas-depleted intermediate stream (23).

Aspect 48. The process according to any one of aspects 39, or 43 to 47 wherein the purification unit (20) is an adsorption-type separation unit comprising a plurality of adsorption beds and operating with a plurality of adsorption cycles, some comprising a pressure equalization step, wherein controlling the operating conditions of the purification unit (20) comprises:

changing to an adsorption cycle having a lesser degree of pressure equalization by employing a lesser number of or no pressure equalization steps and/or reducing the total moles of gas transferred in one or more pressure equalization steps to increase the flow rate of light noble gas in the light noble gas-depleted intermediate stream (23); and/or changing to an adsorption cycle having a greater degree of pressure equalization by employing a greater number of pressure equalization steps and/or increasing the total moles of gas transferred in one or more pressure equalization steps to decrease the flow rate of light noble gas in the light noble gas-depleted intermediate stream (23).

Aspect 49. The process according to any one of aspects 39, or 43 to 48 wherein the purification unit (20) is an adsorption-type separation unit operating with an adsorption cycle comprising a purge step containing the light noble gas in the light noble gas-enriched intermediate stream, and controlling the operating conditions of the purification unit (20) comprises:

increasing the flow rate of the purge step to increase the flow rate of the light noble gas in the light noble gas-depleted intermediate stream (23); and/or decreasing the flow rate of the purge step to decrease the flow rate of the light noble gas in the light noble gas-depleted intermediate stream (23).

Aspect 50. The process according to any one of aspects 39, or 43 to 49 wherein the purification unit (20) is an adsorption-type separation unit operating with an adsorption cycle comprising a feed and product repressurization step, and controlling the operating conditions of the purification unit comprises:

increasing the ratio of feed flow to product flow in the repressurization step to increase the flow rate of light noble gas in the light noble gas-depleted intermediate stream (23); and/or decreasing the ratio of feed flow to product flow in the repressurization step to decrease the flow rate of light noble gas in the light noble gas-depleted intermediate stream (23).

Aspect 51. The process according to any one of aspects 39, or 43 to 50 wherein the purification unit (20) is an adsorption-type separation unit operating with an adsorption cycle comprising a feed temperature, and controlling the operating conditions of the purification unit comprises:

increasing the feed temperature to increase the flow rate of light noble gas in the light noble gas-depleted intermediate stream (23); and/or decreasing the feed temperature to decrease the flow rate of light noble gas in the light noble gas-depleted intermediate stream (23).

Aspect 52. The process according to aspect 39 wherein the purification unit (20) is a distillation-type separation unit having an operating pressure, wherein controlling the operating conditions of the purification unit (20) comprises:

decreasing the operating pressure of the purification unit (20) to increase the flow rate of light noble gas in the light noble gas-depleted intermediate stream (23); and/or increasing the operating pressure of the purification unit (20) to decrease the flow rate of light noble gas in the light noble gas-depleted intermediate stream (23).

Aspect 53. The process according to aspect 39 or aspect 52 wherein the purification unit (20) is a distillation-type separation unit operating with a reflux ratio, wherein controlling the operating conditions of the purification unit (20) comprises:

increasing the reflux ratio of the purification unit (20) to increase the flow rate of light noble gas in the light noble gas-depleted intermediate stream (23); and/or decreasing the reflux ratio of the purification unit (20) to decrease the flow rate of light noble gas in the light noble gas-depleted intermediate stream (23).

Aspect 54. The process according to any one of aspects 39 or 52 to 53 wherein the purification unit (20) is a distillation-type separation unit having an operating temperature, wherein controlling the operating conditions of the purification unit (20) comprises:

decreasing the operating temperature of the purification unit (20) to increase the flow rate of light noble gas in the light noble gas-depleted intermediate stream (23); and/or increasing the operating temperature of the purification unit (20) to decrease the flow rate of light noble gas in the light noble gas-depleted intermediate stream (23).

Aspect 55. The process according to any one of aspects 33 to 54 wherein the second gas stream (17) comprises a portion (28) of the light noble gas-rich product stream (25) having a flow rate, and the flow rate of the light noble gas in the second gas steam (17) is increased by increasing the flow rate of the portion (28) of the light noble gas-rich product stream (25) and decreased by decreasing the flow rate of the portion (28) of the light noble gas-rich product stream (25).

Aspect 56. The process according to any one of aspects 33 to 55 wherein the feed gas stream (11) has a molar concentration of light noble gas ranging from 0.1 mole % to 2.0 mole %, or ranging from 0.1 mole % to 1.0 mole %.

Aspect 57. The process according to any one of aspects 39 or 43 to 51 wherein the purification unit (20) is a rapid cycle adsorption unit.

Aspect 58. The process according to aspect 57 wherein the rapid cycle adsorption unit comprises one or more rotary valves.

Aspect 59. The process according to aspect 57 or 58 wherein the rapid cycle adsorption unit comprises a rotor assembly and a first and second stator assemblies, wherein:

the rotor assembly is positioned between the first and second stator assemblies and comprises a plurality of adsorption beds each bed having a rotor port at either end of the bed via which gas enters or exits said bed;

the first stator assembly comprises at least one feed port, at least one exhaust port and a first stator plate having at least one feed slot for directing at least one feed gas stream from the feed port(s) into any of the rotor ports that are in alignment with the slot and at least one exhaust slot for directing flow of exhaust gas streams from any of the rotor ports that are in alignment with the slot to the exhaust port(s);

the second stator assembly comprises at least one product port and a second stator plate having at least one product slot for directing flow of at least one product gas stream between the product port(s) and any of the rotor ports that are in alignment with the slot and at least one purge slot for directing flow of at least one purge gas stream into any of the rotor ports that are in alignment with the slot; and the rotor assembly being rotatable relative to the first and second stator assemblies so as to change the operating modes of individual adsorption beds by changing which rotor ports are in alignment with which slots in the first and second stator plates.

Aspect 60. The process according to any one of aspects 57 to 59 wherein the rapid cycle adsorption unit comprises 6 to 9 beds each comprising a bed of adsorbent.

BRIEF DESCRIPTION OF SEVERAL VIEWS OF THE DRAWINGS

FIG. 3 is a cycle chart for a 5-bed adsorption separation unit suitable for the process.

DETAILED DESCRIPTION OF THE PREFERRED EMBODIMENTS

Figure 1:
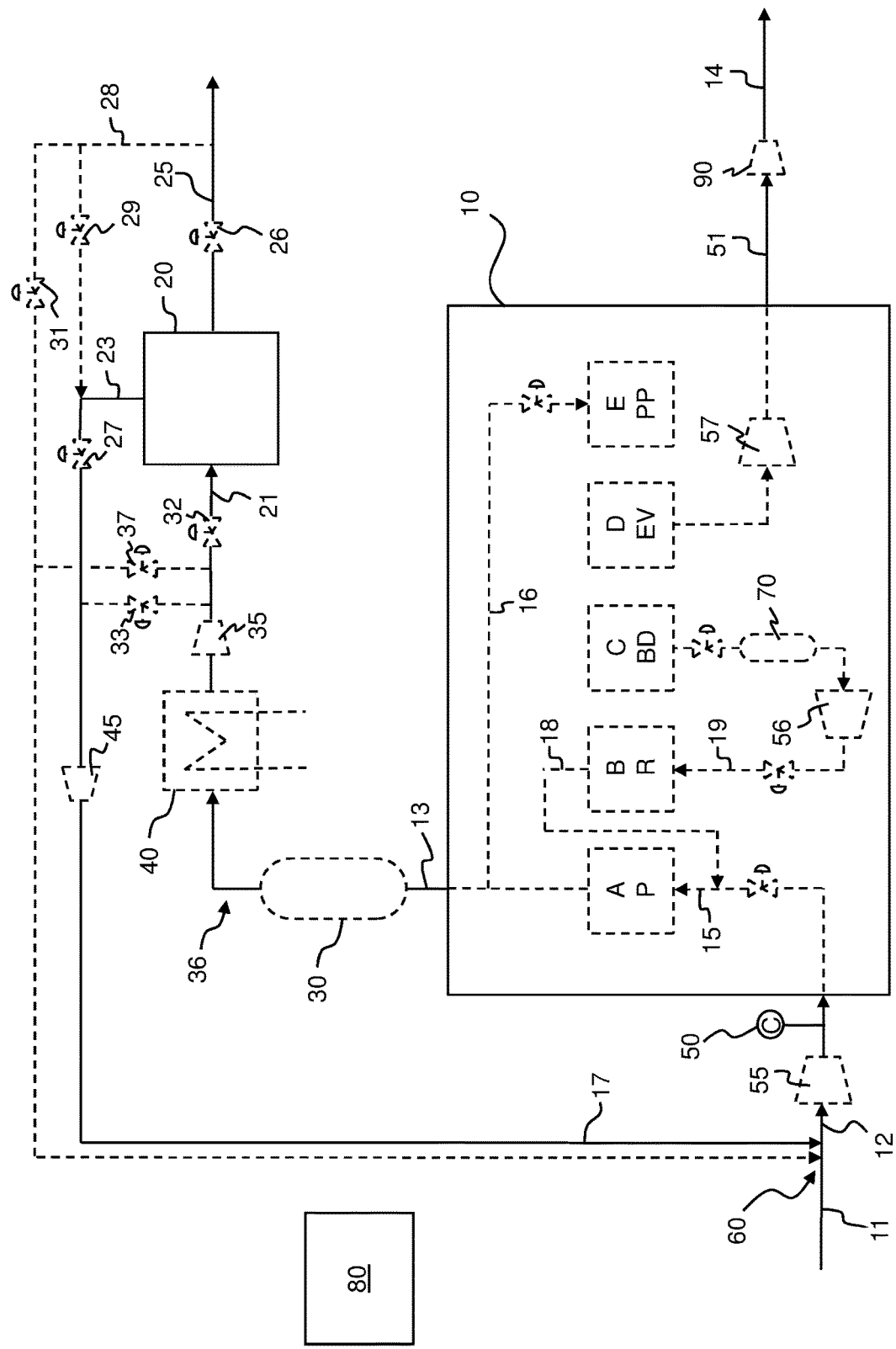
FIG. 1 is a process flow diagram for a light noble gas recovery process according to the present process and apparatus.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from the scope of the invention as defined by the claims.

The articles "a" or "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all, indiscriminately of quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The phrase "at least a portion" means "a portion or all." The at least a portion of a stream may have the same composition, with the same concentration of each of the species, as the stream from which it is derived. The at least a portion of a stream may have a different concentration of species than that of the stream from which it is derived. The at least a portion of a stream may include only specific species of the stream from which it is derived.

As used herein a "divided portion" of a stream is a portion having the same chemical composition and species concentrations as the stream from which it was taken.

As used herein a "separated portion" of a stream is a portion having a different chemical composition and different species concentrations than the stream from which it was taken. A separated portion may be, for example, a portion formed from separation in a separator.

The term "portion" includes both a "divided portion" and a "separated portion."

As used herein, "first," "second," "third," etc. are used to distinguish among a plurality of steps and/or features, and is not indicative of the total number, or relative position in time and/or space, unless expressly stated as such.

The terms "depleted" or "lean" mean having a lesser mole % concentration of the indicated component than the original stream from which it was formed. "Depleted" and "lean" do not mean that the stream is completely lacking the indicated component.

The terms "rich" or "enriched" mean having a greater mole % concentration of the indicated component than the original stream from which it was formed.

As used herein, "in fluid communication" or "in fluid flow communication" means operatively connected by one or more conduits, manifolds, valves and the like, for transfer of fluid. A conduit is any pipe, tube, passageway or the like, through which a fluid may be conveyed. An intermediate device, such as a pump, compressor or vessel may be present between a first device in fluid flow communication with a second device unless explicitly stated otherwise.

Downstream and upstream refer to the intended flow direction of the process fluid transferred. If the intended flow direction of the process fluid is from the first device to the second device, the second device is downstream of the first device. In case of a recycle stream, downstream and upstream refer to the first pass of the process fluid.

For the purposes of simplicity and clarity, detailed descriptions of well-known devices, circuits, and methods are omitted so as not to obscure the description of the present invention with unnecessary detail.

The present apparatus and process are described with reference to the figures. In this disclosure, a single reference number may be used to identify a process gas stream and the process gas transfer line that carries said process gas stream. Which feature the reference number refers to will be understood depending on the context.

The present apparatus and process are for separating a feed gas 11 containing a light noble gas and at least one other gaseous component into a light noble gas-rich product gas 25 and a light noble gas-lean product gas 14. The light noble gas may be helium, neon, or argon.

The feed gas 11 may be natural gas. The light noble gas may be helium. The at least one other component may be methane. Another component may be nitrogen. Some natural gas sources are known to comprise methane, nitrogen, and helium.

The feed gas 11 may be a non-condensable vent gas from an air separation unit (ASU). The light noble gas may be neon. The at least one other component may be nitrogen. Another component may be oxygen. Another component may be argon. Air is known to comprise nitrogen, oxygen, argon, and neon.

The feed gas 11 may be natural gas. The light noble gas may be argon. The at least one other component may be methane. Another component may be carbon dioxide. Another component may be nitrogen. Some natural gas sources are known to comprise methane, carbon dioxide, nitrogen, and argon.

The apparatus comprises an adsorption separation unit 10. An adsorption-type separation unit is any separation unit that separates a feed stream into at least two streams using a solid adsorbent, one stream enriched in species that are more adsorbable and another stream enriched in species that are less adsorbable. The adsorption separation unit 10 comprises a plurality of vessels 100*a*, 100*b*, 100*c*, 100*d*, 100*e*. Each of the plurality of vessels contains a bed of adsorbent suitable for separating the light noble gas from the other components in the feed stream.

Figure 2:
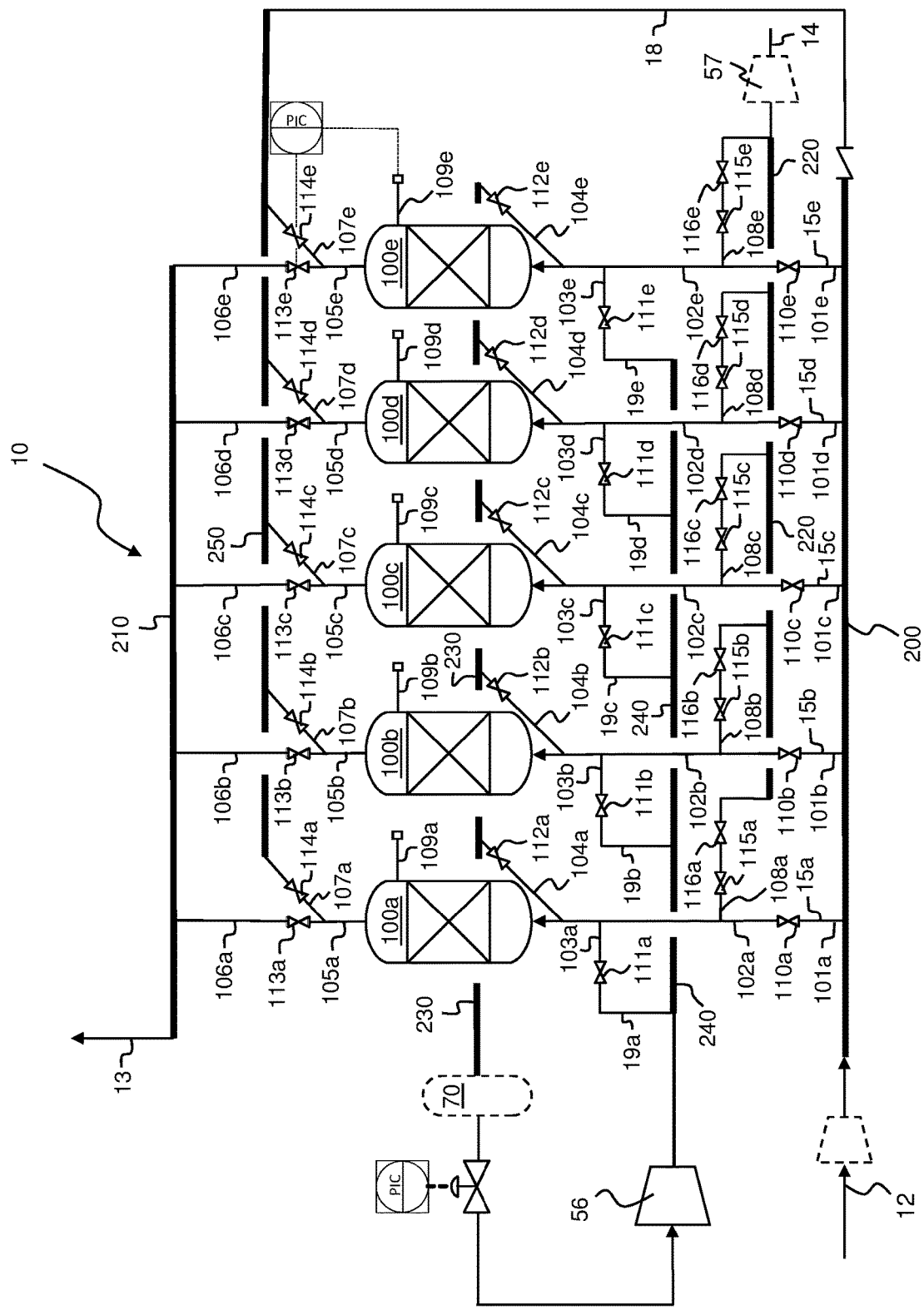
FIG. 2 is a process flow diagram for an adsorption separation unit suitable for the process.

Adsorption separation units generally comprise a plurality of adsorption beds containing suitable adsorbent. While FIGS. 1-3 provide an exemplary adsorption unit with five adsorption beds, any suitable number of adsorption beds may be used. In general, the number of adsorption beds used in the adsorption separation unit and process is designed to meet required product purity and light noble gas product recovery.

For a required product purity, the number of beds can be a trade-off between capital and light noble gas recovery. For example, increasing the number of beds allows the adsorption process to utilize a greater number of pressure equalization steps. Pressure equalization steps are light noble gas saving steps. Increasing the number of pressure equalization steps will reduce the pressure at which gas is discharged from the bed to the waste stream, decreasing light noble gas losses. If the pressure equalization steps are conducted through co-current depressurization of the high-pressure bed, the impurity front advances farther when more pressure equalization steps are used. To maintain the desired production, the size of each bed increases in addition to the number of beds. The degree of pressurization is reduced by reducing the number of pressure equalization steps, but it may also be reduced by reducing the total number of moles of gas transferred over one or more pressure equalization steps, or by any combination of the two methods.

Alternatively, the number of beds may be increased to lengthen the time available to individual steps that may be limiting the efficiency of the overall process. For example, increasing the number of beds allows the adsorption process to increase the number of beds that will process feed gas or process purge gas. Sending gas to more beds on feed or more beds on purge decreases the velocity of the gas passing over the adsorbent particles, which in turn increases the efficiency of the process step.

Generally, more than one adsorption bed is used so that at least one adsorption bed can be producing product gas while another bed is regenerating. In this way, product gas can be produced on a continuous basis.

FIG. 1 illustrates a 5-bed adsorption separation unit with beds A-E. FIG. 2 illustrates adsorption separation unit 10 with 5 adsorption vessels 100a, 100b, 100c, 100d, and 100e. The skilled person can readily select the number of adsorption vessels/beds to use.

The adsorption beds may contain a single adsorbent or multiple adsorbents. In the case of multiple adsorbents, the adsorbents may be interspersed, layered, or a combination thereof.

Suitable adsorbents may be readily selected by those skilled in the art. Suitable adsorbents for separating helium from other gaseous components in natural gas include activated carbon, silica gel, activated alumina, covalent organic frameworks, metal organic frameworks, and zeolites.

The adsorption separation unit may be operated using any known adsorption cycle suitable for separating a light noble gas from a gas mixture comprising the light noble gas and at least one other gas component. Examples are illustrated in U.S. Pat. Nos. 4,077,779 A and 774,068 B2, which both detail pressure swing adsorption cycles for light gas purification.

The adsorption cycle may be a so-called vacuum pressure swing adsorption (VPSA) cycle.

The adsorption cycle may comprise a production step, a co-current rinse step, a blowdown step, an evacuation step, and a product pressurization step. In the exemplary embodiment shown in FIG. 1, adsorption beds A-E are illustrated with a cycle having a production step (P), a co-current rinse step (R), a blowdown step (BD), an evacuation step (EV), and a product pressurization step (PP). During the adsorption cycle, each of the beds cycle in turn through the cycle steps. The corresponding VPSA cycle table for a 5-bed adsorption separation unit is shown in FIG. 3.

The production step is abbreviated herein as "P". The production step is also called the feed step and/or adsorption step in the literature.

As shown in FIG. 2, the adsorption separation unit 10 comprises a feed gas header 200. The feed gas header 200 is in selective fluid communication with each of the plurality of vessels 100a, 100b, 100c, 100d, and 100e for providing a respective portion of separation unit feed gas stream 12 to each of the plurality of vessels. "Selective" fluid communication means that a valve or equivalent device is used to selectively provide fluid communication between components (i.e. between the feed gas header and each of the plurality of vessels). As shown in FIG. 2, valve 110a provides selective fluid communication between the feed gas header 200 and adsorption vessel 100a, valve 110b provides selective fluid communication between the feed gas header 200 and adsorption vessel 100b, and so on.

In the embodiment shown in FIGS. 1 and 3, the adsorption vessel feed gas 15 comprises the combined gas stream 12 and rinse gas effluent 18 from an adsorption vessel undergoing a rinse step. In the embodiment shown in FIG. 2, the feed gas header 200 receives the combined gas stream 12 and rinse gas effluent 18 from an adsorption vessel undergoing a rinse step via the rinse gas effluent header 250. A rinse gas effluent header 250 may or may not be used depending on the selected adsorption cycle. The combined gas stream 12 is formed from the permeate stream 41 and second gas stream 17 (discussed in more detail below).

Adsorption vessel feed gas 15 passes from the feed gas header 200, through a respective open feed gas valve 110 (valve 110a for vessel 100a, valve 110b for vessel 100b, etc.), and into a respective adsorption vessel 100 for a production step of the adsorption cycle.

In the production step, the adsorption vessel feed gas stream 15 containing the light noble gas (for example helium) is introduced at a feed gas pressure into an adsorption bed undergoing the production step and the secondary gas components (for example $CH_4$ and $N_2$) are adsorbed on the adsorbent in the adsorption bed undergoing the production step while a light noble gas-enriched intermediate stream 13 is simultaneously withdrawn from the adsorption bed undergoing the production step and passed to a product gas header 210. The product gas header 210 is in selective fluid communication with each of the plurality of vessels 100a, 100b, 100c, 100d, and 100e for receiving light noble gas-enriched intermediate gas 13 from each of the plurality of vessels when on a production step. The product gas header 210 is in selective fluid communication with each respective vessel 100 by way of a respective product valve 113 (valve 113a for vessel 100a, valve 113b for vessel 100b, etc.). The light noble gas-enriched intermediate gas 13 contains a higher concentration of light noble gas than the adsorption vessel feed gas stream 15 and is depleted of the secondary gas components. The duration of the production step may be any suitable duration, for example from 1 second to 300 seconds, or from 30 seconds to 300 seconds. The skilled person can readily determine a suitable duration for any of the known adsorption cycle steps.

The pressure in the adsorption bed undergoing the production step may range, for example from 0.1 MPa to 3.4 MPa or from 0.3 MPa to 1.2 MPa (absolute pressure).

Each of the adsorption beds has a "feed end" and a "product end," so termed because of their function during the production step of the adsorption cycle. A feed gas mixture is introduced into the "feed end" of the adsorption bed and a product gas is withdrawn from the "product end" during the production step of the cycle. During other steps of the adsorption cycle, gas may be introduced or withdrawn from "feed end." Likewise, during other steps of the adsorption cycle, gas may be introduced or withdrawn from the "product end."

The direction of flow during other steps is typically described with reference to the direction of flow during the production step. Thus, gas flow in the same direction as the gas flow during the production step is "co-current" (sometimes called "concurrent") and gas flow that is in the opposite direction to the gas flow during the production step is "counter-current." Co-currently introducing a gas into an adsorption bed means to introduce the gas in the same direction as the feed gas introduced during the production step (i.e. introducing into the feed end). Counter-currently introducing a gas into an adsorption bed means to introduce the gas in a direction opposite to the direction of the feed gas flow during the feed step (i.e. introducing into the product end). Co-currently withdrawing a gas from an adsorption bed means to withdraw the gas in the same direction as the product gas during the production step (i.e. withdrawing from the product end). Counter-currently withdrawing a gas from an adsorption bed means to withdraw the gas in a direction opposite to the direction of the product gas flow during the production step (i.e. withdrawing from the feed end).

The blowdown step, abbreviated "BD", comprises counter-currently withdrawing a blowdown gas from an adsorption bed undergoing the blowdown step. The blowdown gas has a concentration of the secondary gas components that is higher than the concentration of the secondary gas components in the adsorption vessel feed gas stream 15. The blowdown gas may be withdrawn from the adsorption bed undergoing the counter-current blowdown step until the pressure in the adsorption bed undergoing the counter-current blowdown step reaches a blowdown pressure ranging from 40 kPa to 1000 kPa. The blowdown pressure is the pressure in the adsorption bed at the end of the counter-current blowdown step.

As shown in FIG. 1, the blowdown gas may be passed from the adsorption bed undergoing the blowdown step to a buffer vessel 70 and compressed in compressor 56 to form a rinse gas 19 for the rinse step, "R". As shown in FIG. 2, blowdown gas is passed to blowdown gas header 230, to buffer vessel 70, to compressor 56, and passed to rinse gas supply header 240. A rinse gas supply header 240 may or may not be used depending on the selected adsorption cycle.

The rinse step is abbreviated "R". The rinse step comprises co-currently introducing a rinse gas 19 into an adsorption bed undergoing the rinse step while simultaneously co-currently withdrawing a rinse gas effluent 18 from the adsorption bed undergoing the rinse step. During a rinse step, the more strongly adsorbed components displace the less strongly adsorbed components from the adsorbent and void spaces, providing a means to increase the recovery of the less strongly adsorbed components, i.e. the light noble gas. A rinse gas may be formed from the blowdown gas. A rinse gas may also be formed from the light noble gas-depleted intermediate stream, an external source of gas which is absent of light noble gas, or any combination thereof.

As shown in FIG. 1, the rinse gas effluent stream 18 may be introduced along with the adsorption separation unit feed gas stream 12 into the adsorption bed undergoing the production step, "P", as adsorption vessel feed gas stream 15.

Forming a rinse gas from the blowdown gas, in combination with the rinse step, in combination with introducing the rinse gas effluent into the adsorption bed undergoing the production step has the technical effect of increasing the recovery of light noble gas.

As shown in FIG. 1, the adsorption cycle may also include an evacuation step, "EV". The evacuation step is similar to the blowdown step, with the addition of using a compressor, vacuum pump, or the like, 57 to draw the pressure down below atmospheric pressure. The gas evacuated from the adsorption bed undergoing the evacuation step is passed to a tail gas header 220, and then to a compressor 57 where it is discharged from the compressor 57 as tail gas stream 51.

The tail gas header 220 is in selective fluid communication with each of the plurality of vessels for receiving light noble gas-lean gas from each of the plurality of vessels. Selective fluid communication between the tail gas header and each of the respective adsorption vessels 100 is provided via valves 115 and 116 (115a and 116a for vessel 100a, 115b and 116b for vessel 100b, etc.). The tail gas header 220 is in fluid communication with an outlet of the adsorption separation unit 10 for discharging the light noble gas-lean gas from the adsorption separation unit 10. For the case where the feed gas stream 11 is natural gas that contains helium, tail gas stream 51 is natural gas stripped of helium and can be introduced into a natural gas pipeline for any desired use.

Depending on the adsorption cycle used, the blowdown gas header may also be a tail gas header, for example when the blowdown gas is discharged from the adsorption separation unit 10 as a light noble gas-lean gas.

As shown in FIG. 1, the adsorption cycle may also include a product pressurization step, "PP". The product pressurization step comprises counter-currently introducing a portion of the product gas 16 into the bed to pressurize the vessel. As shown in FIG. 2, product gas 16 may be introduced into a respective adsorption vessel 100 from product gas header 210 via a respective product gas valve 113. Product gas 16 may be introduced into the adsorption bed undergoing the product pressurization step until the adsorption bed undergoing the product pressurization step is substantially at the feed gas pressure.

If desired, the adsorption cycle may include various other adsorption cycle steps, such as pressure equalization steps. Various adsorption cycle steps are discussed, for example, in U.S. Pat. No. 9,381,460.

Adsorption cycles have a cycle time. The cycle time is a well-understood and conventional term in the art. The adsorption separation unit undergoes a repeated series of cycle steps of a defined adsorption cycle. The cycle time is the time period required to complete one adsorption cycle from start to finish.

The plurality of vessels 100a, 100b, 100c, 100d, 100e are operatively connected to the various headers 200, 210, 220, 230, 240, and 250 by respective process gas transfer lines 101, 102, 103, 104, 105, 106, 107, and 108. As used herein, process gas transfer lines are any fluid-tight conveyance means for transferring process gas therein, for example, pipes, tubes, conduits, ducts, hoses, etc.

Each vessel of the plurality of vessels 100a, 100b, 100c, 100d, 100e have process gas transfer lines associated therewith (process gas transfer lines 101a, 102a, 103a, 104a, 105a, 106a, 107a, and 108a for vessel 100a; process gas transfer lines 101b, 102b, 103b, 104b, 105b, 106b, 107b, and 108b for vessel 100b; process gas transfer lines 101c, 102c, 103c, 104c, 105c, 106c, 107c, and 108c for vessel 100c; process gas transfer lines 101d, 102d, 103d, 104d, 105d, 106d, 107d, and 108d for vessel 100d; and process gas transfer lines 101e, 102e, 103e, 104e, 105e, 106e, 107e, and 108e for vessel 100e). Process gas transfer lines are "associated" with a specific vessel if they provide fluid communication between the specific vessel and an adjacent header. Process gas transfer lines are associated with a specific vessel if they are operatively disposed between the specific vessel and an adjacent header (and not beyond the adjacent header). Referring to FIG. 2, only the "a" process gas transfer lines are associated with vessel 100a, only the "b" process gas transfer lines are associated with vessel 100b, only the "c" process gas transfer lines are associated with vessel 100c, only the "d" process gas transfer lines are associated with vessel 100d, only the "e" process gas transfer lines are associated with vessel 100e.

As shown in FIG. 2, there are a plurality of valves (valves 110a, 111a, 112a, 113a, 114a, 115a, and 116a for vessel 100a; valves 110b, 111b, 112b, 113b, 114b, 115b, and 116b for vessel 100b; valves 110c, 111c, 112c, 113c, 114c, 115c, and 116c for vessel 100c; valves 110d, 111d, 112d, 113d, 114d, 115d, and 116d for vessel 100d; valves 110e, 111e, 112e, 113e, 114e, 115e, and 116e for vessel 100e) in the process gas transfer lines including a plurality of valves adjacent and associated with each respective vessel 100. The valves control the flow of process gas to and from the adsorption vessels 100a, 100b, 100c, 100d, and 100e in order to implement the various cycle steps.

Valves are "associated" with a specific vessel if they are operatively disposed between the specific vessel and an adjacent header (and not beyond the adjacent header). A valve associated with a specific vessel can control flow between the specific vessel and an adjacent header.

A valve is "adjacent" the vessel if no other valve is operatively disposed in the process gas transfer line between said valve and the vessel; there is no valve interposed in the process gas transfer line between an adjacent valve and the respective vessel. A valve in a process gas transfer line operatively disposed between a second valve and the vessel, when closed, would prevent process gas flow to the vessel from the second valve or from the vessel to the second valve.

Referring to FIG. 2, valves 110a, 111a, 112a, 113a, 114a, and 115a are associated and adjacent to vessel 100a. Valve 116a is associated with vessel 100a but not adjacent vessel 100a because valve 115a is operatively disposed between vessel 100a and valve 116a. Likewise, valves 110b, 111b, 112b, 113b, 114b, and 115b are associated and adjacent to vessel 100b. Valve 116b is associated with vessel 100b but not adjacent vessel 100b because valve 115b is operatively disposed between vessel 100b and valve 116b.

The present apparatus may be characterized by an adsorption separation unit 10 constructed to keep process gas transfer line volume and dead-end volumes that fill with substantial amounts light noble gas during a pressurizing step and empty through the tail gas header during a depressurizing step below a threshold level. These particular volumes carry a significant amount of light noble gas out of the system in a stream that is not captured in the light noble gas product stream. That is, these volumes reduce the light noble gas recovery efficiency.

This separation unit construction may be defined in terms of a central volume and a secondary volume for each of the vessels 100a, 100b, 100c, 100d, and 100e, as detailed below.

The central volume for each vessel 100 is a specified volume of process gas transfer lines associated with each respective vessel 100. The central volume for each respective vessel is the sum of:
  (i) the volume contained in the process gas transfer lines associated with the respective vessel connecting the respective vessel to each valve adjacent 110, 111, 112, 113, 114, 115 the respective vessel 100,
  (ii) all dead-end volumes 109, if any, connected at a junction to the respective vessel 100, and
  (iii) all dead-end volumes (not shown), if any, connected at a junction to any of the process gas transfer lines associated with the respective vessel 100 that connect the respective vessel 100 to any valve adjacent 110, 111, 112, 113, 114, 115 the respective vessel 100.

The central volume for a vessel 100 does not include the volume of the vessel itself.

A detailed description of the process gas transfer lines making up the central volume for vessel 100a will be provided. The process gas transfer lines making up the central volume for vessels 100b, 100c, 100d, and 100e are to be understood from this detailed description with the necessary changes having been made with regard to the reference numbers (i.e. "b" substituted for "a" for vessel 100b, "c" substituted for "a" for vessel 100c, "d" substituted for "a" for vessel 100d, and "e" substituted for "a" for vessel 100e).

The central volume for vessel 100a includes (i) the volume contained in the process gas transfer lines associated with vessel 100a connecting vessel 100a to each valve adjacent vessel 100a. With reference to FIG. 2, the valves adjacent vessel 100a include valves 110a, 111a, 112a, 113a, 114a, and 115a. The process gas transfer lines associated with vessel 100a and that connect vessel 100a to these valves include process gas transfer lines 102a, 103a, 104a, 105a, 107a and 108a. Process gas transfer line 102a connects vessel 100a to adjacent valve 110a. Process gas transfer line 103a connects vessel 100a to adjacent valve 111a. Process gas transfer line 104a connects vessel 100a to adjacent valve 112a. Process gas transfer line 105a connects vessel 100a to adjacent valve 113a. Process gas transfer line 107a connects vessel 100a to adjacent valve 114a. Process gas transfer line 108a connects vessel 100a to adjacent valve 115a.

The central volume for vessel 100a includes (ii) all dead-end volumes, if any, connected at a junction to the respective vessel 100.

A "dead-end volume" is defined as a volume in continuous open fluid communication with the respective vessel that permits ingress and egress of process gas only at the junction of the dead-end volume. "Continuous open fluid communication" means that the dead-end volume is continuously in fluid communication with the respective vessel during the process. No valve or other device cuts off fluid communication of the dead-end volume from the respective vessel.

Referring to FIG. 2, process gas sensor line 109a is such a dead-end volume.

The adsorption separation unit 10 may be constructed so as to have no dead-end volumes connected at a junction to any of the vessels 100.

The central volume for vessel 100a includes (iii) all dead-end volumes, if any, connected at a junction to any of the process gas transfer lines associated with vessel 100a that connects vessel 100a to any valve adjacent 110a, 111a, 112a, 113a, 114a, 115a vessel 100a. The process gas transfer lines associated with vessel 100a that connect vessel 100a to adjacent valves 110a, 111a, 112a, 113a, 114a, 115a include process gas transfer lines 102a, 103a, 104a, 105a, 107a, and 108a. FIG. 2 shows no such dead-end volumes. However, one such dead-end volume would exist if sensor line 109a were moved to form a junction with process gas transfer line 105a instead of the junction with vessel 100a.

The central volume for each vessel has a respective volume amount, $V_c$.

The central volume for each respective vessel includes a secondary volume which is a subset of the central volume. The secondary volume is the undesired volume that reduces the light noble gas recovery efficiency.

The secondary volume for each respective vessel 100 is the sum of:
  (i) the volume of all dead-end volumes, if any, connected to the respective vessel 100,
  (ii) the volume of all dead-end volumes, if any, connected at a junction to any of the process gas transfer lines associated with the respective vessel 100 that connect the respective vessel 100 to any valve adjacent 110, 111, 112, 113, 114, 115 the respective vessel 100, and
  (iii) the volume of any process gas transfer lines, if any, having a first end terminating in a valve adjacent the respective vessel 100 that is configured to permit transfer of process gas to the tail gas header 220 when open and having a second end terminating at a junction to any other of the associated process gas transfer lines that connect the respective vessel 100 to any other valve adjacent 110 the respective vessel 100.

The secondary volume for a vessel 100 does not include the volume of the vessel itself.

A detailed description of the process gas transfer lines making up the secondary volume for vessel 100*a* will be provided. The process gas transfer lines making up the secondary volume for vessels 100*b*, 100*c*, 100*d*, and 100*e* are to be understood from this detailed description with the necessary changes having been made with regard to the reference numbers (i.e. "b" substituted for "a" for vessel 100*b*, "c" substituted for "a" for vessel 100*c*, "d" substituted for "a" for vessel 100*d*, and "e" substituted for "a" for vessel 100*e*).

The secondary volume for vessel 100*a* includes (i) all dead-end volumes, if any, connected at a junction to the respective vessel 100.

Referring to FIG. 2, process gas sensor line 109*a* is such a dead-end volume according to criteria (i).

The adsorption separation unit 10 may be constructed so as to have no dead-end volumes connected at a junction to any of the vessels 100.

The secondary volume for vessel 100*a* includes (ii) all dead-end volumes, if any, connected at a junction to any of the process gas transfer lines associated with vessel 100*a* that connects vessel 100*a* to any valve adjacent 110*a*, 111*a*, 112*a*, 113*a*, 114*a*, 115*a* vessel 100*a*. The process gas transfer lines associated with vessel 100*a* that connect vessel 100*a* to adjacent valves 110*a*, 111*a*, 112*a*, 113*a*, 114*a*, 115*a* include process gas transfer lines 102*a*, 103*a*, 104*a*, 105*a*, 107*a*, and 108*a*. FIG. 2 shows no such dead-end volumes. However, one such dead-end volume would exist if sensor line 109*a* were moved to form a junction with process gas transfer line 105*a* instead of the junction with vessel 100*a*.

The secondary volume for vessel 100*a* includes (iii) the volume of any process gas transfer lines, if any, having a first end terminating in a valve adjacent the respective vessel 100*a* that is configured to permit transfer of process gas to the tail gas header 220 when open and having a second end terminating at a junction to any other of the associated process gas transfer lines that connect the respective vessel 100*a* to any other valve adjacent the respective vessel 100*a*. Referring to FIG. 2, process gas transfer line 108*a* has a first end terminating in valve 115*a* which is adjacent vessel 100*a*. Valve 115*a* is configured to permit transfer of process gas to the tail gas header 220 when open. Process gas transfer line 108*a* has a second end terminating at a junction with process gas transfer line 102*a* which connects vessel 100*a* to valve 110*a* which is adjacent vessel 100*a*. Process gas transfer line 108*a* is therefore such a volume contributing to the secondary volume as per criteria (iii).

Each vessel has a respective secondary volume, $V_2$.

We have discovered that the secondary volume of an adsorption-type separation unit has an impact on the recovery efficiency of light noble gas where the feed gas composition has a low concentration of the light noble gas.

By providing an adsorption-type separation unit with a secondary volume which is much smaller than the central volume, more of the light noble gas can be fed to a purification unit to meet the final product purity specifications for the system.

It is desirable, therefore, to construct the adsorption separation unit 10 with a secondary volume that is small relative to the central volume. The secondary volume, $V_2$, may be less than 5%, or less than 3%, or less than 1% of the central volume, $V_c$, for each vessel 100. The secondary volume, $V_2$, may be 0.

Isolation valves (not shown) may be used to reduce the secondary volume. For example, with reference to vessel 100*a* in FIG. 2, an isolation valve (not shown) may be positioned in process gas transfer line 102*a* between vessel 100*a* and valve 115*a*. In this instance, valve 115*a* is no longer an adjacent valve. The isolation valve can be operated to prevent process gas transfer line 108*a* from filling with product gas having a higher concentration of light noble gas during repressurization. Process gas transfer line 108*a* may be instead repressurized in the rinse step with a rinse gas having a lower concentration of light noble gas. However, using isolation valves adds further complexity with regard to the timing of opening and closing the isolation valves during the adsorption cycle.

Also not shown are process gas transfer lines and valves associated with each of the vessels for bypass, vent, startup, shutdown, maintenance and the like, which are well-known and customary for adsorption separation units. These process gas transfer lines may also contribute to the central volume and secondary volume.

The present apparatus may further comprise a purification unit 20. The purification unit may be an adsorption-type separation unit, a rapid cycle adsorption unit, a membrane-type separation unit, or a distillation-type separation unit.

An adsorption-type separation unit is any separation unit that separates a feed stream into at least two streams using adsorption, each stream having a different concentration of species. As used herein, the term "adsorption" includes any separation which separates components by their relative adhesion of species (atoms, ions, or molecules) to an adsorbent surface.

Adsorption cycles have a cycle time. The cycle time is a well-understood and conventional term in the art. The adsorption separation unit undergoes a repeated series of cycle steps of a defined adsorption cycle. The cycle time is the time period required to complete one adsorption cycle from start to finish.

A rapid cycle adsorption unit is any adsorption-type separation unit that uses a rapid cycle. Rapid cycles are discussed in more detail in U.S. application Ser. Nos. 16/102,936 and 16/103,569, both filed Aug. 14, 2018 and both incorporated herein by reference. As used herein, the term "rapid" means that the total duration of the production step, also called the feed step and/or the adsorption step, of the cycle is preferably 45 seconds or less, the production step being the step of the cycle in which the adsorbent bed is at elevated pressure (relative to the pressure in the bed during other steps of the process) and a feed stream is being introduced into and passed through the bed to adsorb one or more components from the feed stream to produce a product stream exiting the bed that is depleted (relative to the composition of the feed stream) in the adsorbed component, as is well known in the art. The total duration of the production step of the cycle may be at least 3 seconds. The production step may have a total duration of from 3 to 45 seconds, or from 3 to 16 seconds.

The rapid cycle adsorption unit may have a cycle time of 100 seconds or less, the cycle time being the amount of time taken to complete one full set of steps of the adsorption cycle. Further, the rapid cycle adsorption unit may have a cycle time of 60 seconds or less, 50 seconds or less, or 40 seconds or less. The rapid cycle adsorption unit may have a cycle time of at least 15 seconds.

The adsorption beds may be filled with conventional random packed adsorbent or structured adsorbent (monolith, laminate, or perforated forms). It has been established that a structured adsorbent helps to reduce deleterious effects of mass transfer resistances and flow friction pressure drop for rapid cycle adsorption units operated with higher cycle frequencies.

A membrane-type separation unit can be any separation unit that separates a feed stream into two streams using a membrane, defined in the same manner as previously when discussing the feed membrane separation unit, where the membrane can be a single membrane unit or multiple membranes in series or parallel.

A distillation-type separation unit is any separation unit that separates a feed stream into two streams using distillation, each stream having a different concentration of species. As used herein, the term "distillation" includes any separation which separates components by their relative volatilities. Other terms used in the industry include fractionation, rectification, and partial condensation.

The purification unit 20 has an inlet, a first outlet, and a second outlet. The inlet is in fluid communication with the product gas header 210 of the adsorption separation unit 10. The inlet of the purification unit 20 is operatively disposed to receive at least a portion of the light noble gas-enriched intermediate gas 13 from the product gas header 210. A light noble gas-depleted intermediate gas 23 is discharged from the first outlet of the purification unit 20. A light noble gas-rich product gas 25 is discharged from the second outlet of the purification unit 20.

The present apparatus may comprise a gas mixer 60. The gas mixer 60 has a first inlet for receiving a stream of the feed gas 11, a second inlet in fluid communication with a source of a second gas 17, and an outlet. The gas mixer 60 may be a mixing tee, mixing vessel, static mixer, or any other suitable mixing device capable of combining multiple streams to form a blended stream comprising the multiple streams. The second inlet of the gas mixer 60 receives a second gas 17 from a source of the second gas where the second gas has a higher light noble gas content than the feed gas 11. The source of the second gas may be the first outlet of the purification unit 20. The second gas 17 may comprise the light noble gas-depleted intermediate gas 23 from the purification unit 20. The apparatus may comprise a compressor 45 to compress the light noble gas-depleted intermediate gas 23 before the light noble gas-depleted intermediate gas 23 is fed to the gas mixer 60. A separation unit feed gas 12 is formed from the feed gas 11 and the light noble gas-depleted intermediate gas 23 and is discharged from the outlet of the gas mixer 60 and passed to the feed gas header 200 of the adsorption separation unit 10.

The feed gas header 200 of the adsorption separation unit 10 is in downstream fluid communication with the outlet of the gas mixer 60. The feed gas header 200 of the adsorption separation unit 10 is operatively disposed to receive the separation unit feed gas 12 from the gas mixer 60.

The present apparatus may comprise a sensor 50 operatively disposed to detect a measure of the helium content and transmit signals responsive to the helium content. The sensor 50 may be located in a process gas transfer line 11 supplying the first inlet of the gas mixer 60. At this location, the sensor 50 would be operatively disposed to detect a measure of the light noble gas content in the feed gas 11. As shown in FIG. 1, the sensor may be located in a process gas transfer line 12 connecting the outlet of the gas mixer 60 to the feed gas header 200 of the adsorption separation unit 10. At this location, the sensor 50 is operatively disposed to detect a measure of the light noble gas content in the separation unit feed gas 12. Alternatively, the sensor 50 may be located in the feed gas header 200. In this location, the sensor 50 would be operatively disposed to detect a measure of the light noble gas content in the adsorption vessel feed gas 15.

More than one sensor 50 may be used. In case more than one sensor 50 is used, one or more sensors may be present in the process gas transfer line 11 supplying the first inlet of the gas mixer 60 and/or the process gas transfer line 12 connecting the outlet of the gas mixer 60 to the feed gas header 200 of the adsorption separation unit 10 and/or in the feed gas header 200.

The measure of the light noble gas content may be a light noble gas concentration. The measured light noble gas concentration may be determined by a concentration sensor 50 that detects the light noble gas concentration. The measured light noble gas concentration may be a mole fraction, mass fraction, mole %, mass %, volume %, or any other suitable concentration unit. The light noble gas concentration may be in any light noble gas concentration units.

The present apparatus may comprise a controller 80 in signal communication with the sensor 50. The signal communication may be wireless or hard-wired. The controller is operable to control operating conditions of the purification unit 20 responsive to signals from the sensor 50. The purification unit 20 is controlled to regulate the flow rate of the light noble gas in the second gas stream 17 responsive to the measure of the light noble gas content.

The second inlet of the gas mixer 60 may be in fluid communication with the second outlet of the purification unit 20. The gas mixer 60 may receive a portion 28 of the light noble gas-rich product gas 25 from the purification unit 20.

The purification unit 20 may comprise a flow regulator 29 operatively disposed between the second inlet of the gas mixer 60 and the second outlet of the purification unit 20. The controller 80 may be operable to control the purification unit 20 by adjusting the flow regulator 29. The flow regulator regulates the flow rate of the portion 28 of the light noble gas-rich product gas 25 from the purification unit 20 to the gas mixer 60 to change the content of light noble gas feed to the adsorption separation unit 10. The controller 80 adjusts the flow regulator 29 responsive to measure of the light noble gas content as determined by sensor 50.

The source of the second gas 17 may comprise a process gas transfer line 36 which operatively connects the product gas header 210 to the inlet to the purification unit 20. The second inlet of the gas mixer 60 may be in fluid communication with the process gas transfer line 36.

The apparatus may comprise a flow regulator 33 operatively disposed between the second inlet of the gas mixer 60 and the process gas transfer line 36. The flow regulator 33 may be in signal communication with the controller 80. The signal communication may be wireless or hard-wired. The controller 80 may be operable to control the flow rate of the light noble gas from the process gas transfer line 36 by adjusting the flow regulator 33 operatively disposed between the second inlet of the gas mixer 60 and the process gas transfer line 36. Flow regulator 33 may regulate the flow rate of a portion of a light noble gas-enriched intermediate stream from the adsorption separation unit 10 to the second inlet of the gas mixer 60 to change the content of light noble gas fed to the adsorption separation unit 10. Controller 80 may adjust flow regulator 33 responsive to the measure of the light noble gas content as determined by sensor 50.

In another embodiment, the gas mixer 60 may have a third inlet. The third inlet may be in fluid communication with the second outlet of the purification unit 20. The third inlet of the gas mixer 60 may receive a portion 28 of the light noble gas-rich product gas 25 from the purification unit 20.

The purification unit 20 may comprise a flow regulator 31 in signal communication with controller 80 and operatively disposed between the third inlet of the gas mixer 60 and the second outlet of the purification unit 20. The controller 80 is operable to control the purification unit 20 by adjusting the flow regulator 31. The flow regulator 31 regulates the flow rate of the portion 28 of the light noble gas-rich product gas 25 from the purification unit 20 to the third inlet of the gas mixer 60 to change the content of light noble gas feed to the adsorption separation unit 10. The controller 80 adjusts the flow regulator 31 responsive to the measure of the light noble gas content as determined by sensor 50.

Alternatively, or in addition, the third inlet of the gas mixer 60 may be in fluid communication with a process gas transfer line 36 which operatively connects the product gas header 210 of the adsorption separation unit 10 to the inlet to the purification unit 20.

The apparatus may comprise a flow regulator 37 operatively disposed between the third inlet of the gas mixer 60 and the process gas transfer line 36. The flow regulator 37 may be in signal communication with the controller 80. The signal communication may be wireless or hard-wired. The controller 80 may be operable to control the flow rate of the light noble gas from the process gas transfer line 36 by adjusting the flow regulator 37 operatively disposed between the third inlet of the gas mixer 60 and the process gas transfer line 36. Flow regulator 37 may regulate the flow rate of a portion of a light noble gas-enriched intermediate stream from the adsorption separation unit 10 to the third inlet of the gas mixer 60 to change the content of light noble gas fed to the adsorption separation unit 10. Controller 80 may adjust flow regulator 37 responsive to the measure of the light noble gas content as determined by sensor 50.

The purification unit 20 may be a membrane-type separation unit. The membrane separation unit can be any membrane device with some selectivity for separating the light noble gas from the other components in the feed when a pressure differential is maintained across the membrane. When the light noble gas is helium, the helium permeability through the membrane is typically greater than that of the other components present in the feed to the membrane. Consequently, the concentration of helium in the non-permeate stream from the membrane separation unit is less than its concentration in the feed stream entering the membrane separation unit. Generally, the pressure of the helium-depleted non-permeate stream is 10-200 kPa absolute lower than the feed stream to the membrane separation unit. The light noble gas-rich product permeate stream may have a pressure ranging from 100 kPa to 500 kPa or 100 kPa to 350 kPa. A higher permeability of helium and/or its selectivity through the membrane is desirable and results in a beneficial effect on the performance of the overall system.

When the purification unit 20 is a membrane-type separation unit, the membrane unit may consist of a single membrane device or, alternatively, several membrane devices configured and operated so as to achieve the separation in the most efficient manner, e.g., a cascade of membranes with internal recycle streams between various stages of the membrane unit. Typically, the membrane devices are manufactured in modules, each having certain semi-permeable membrane areas for permeation.

Sanders et al (Polymer; vol 54; pp 4729-4761; 2013) provide a convenient summary of current membrane technology, which is incorporated by reference herein. They describe the physical parameters and performance characteristics of polymeric membranes including polysulfones, cellulose acetate, aramids, polyimides, and polycarbonates. Essentially all current industrially useful gas separations are performed with polymers such as those listed above or rubbery materials such as silicone. Other membrane materials such as mixed-matrix membranes, perfluoropolymers, thermally rearranged polymers, facilitated transport membranes, metal-organic frameworks, zeolitic-imidazolate frameworks, and carbon molecular sieves are in varying stages of development. The membrane material in the membrane-type separation unit of the present invention can be any of those listed above, or any other material that has a faster permeation rate for some compounds such as helium and a slower permeation rate for some compounds such as methane.

Membrane separation units with some selectivity for separating light noble gases such as helium and neon are available commercially, for example, from Air Products, L'Air Liquide, Ube, Cameron, and UOP.

As shown in FIG. 1, the apparatus may comprise a buffer tank 30 and the light noble gas-enriched intermediate stream 13 may be passed from the adsorption separation unit 10 to buffer tank 30 before being passed to the second membrane separation unit 20. The buffer tank buffers the fluctuation in pressure and light noble gas concentration of the light noble gas-enriched intermediate stream 13 from the adsorption separation unit 10. Uniform light noble gas concentration and pressure improve controllability of the purification unit 20, particularly when the purification unit is a membrane-type unit.

The membrane-type separation unit may comprise one or more adjustable orifices 26 operative to control a pressure in the membrane-type separation unit. The one or more adjustable orifices are operative to control the pressure difference between the second (membrane) separation unit feed gas stream 21 and the light noble gas-rich product (permeate) stream 25.

The one or more adjustable orifices may be valves or functionally equivalent means for controlling flow and/or pressure. FIG. 1 shows a valve 26 in fluid communication with the second outlet of the second (membrane) separation unit 20 and a valve 27 in fluid communication with the first outlet of the second (membrane) separation unit 20. The valves 26 and 27 can be adjusted to control the pressure difference between the purification unit feed gas stream 21 and the light noble gas-rich product (permeate) stream 25.

The pressure difference between the second (membrane) separation unit feed gas stream 21 and the light noble gas-rich product (permeate) stream 25 may be increased or decreased by changing the percent open of the adjustable orifice (i.e. valve 27) in fluid communication with the first outlet for discharging the light noble gas-depleted intermediate (non-permeate) stream 23, and the percent open of the adjustable orifice (i.e. valve 26) in fluid communication with the second outlet for discharging the light noble gas-rich product (permeate) stream 25.

The one or more adjustable orifices may be a valve or similar device capable of controlling pressure in the membrane-type separation unit. The one or more adjustable orifices may be in signal communication with the controller 80. The controller may be operable to control the purification unit 20 by adjusting the one or more adjustable orifices 26. Increasing the back-pressure on the permeate side of the membrane-type separation unit increases the flow rate of light noble gas in the light noble gas-depleted intermediate (non-permeate) stream. Decreasing the back-pressure on the permeate side of the membrane-type separation unit decreases the flow rate of light noble gas in the light noble gas-depleted intermediate (non-permeate) stream.

The membrane-type separation unit may comprise a plurality of membrane modules and one or more control valves that control the fraction of membrane modules on-stream. The one or more control valves may be in signal communication with the controller 80. The controller may be operable to control the purification unit 20 by adjusting the fraction of membrane modules on-stream. Increasing the fraction of membrane modules on-stream decreases the flow rate of light noble gas in the light noble gas-depleted intermediate (non-permeate) stream. Decreasing the fraction of membrane modules on-stream increases the flow rate of light noble gas in the light noble gas-depleted intermediate (non-permeate) stream.

The membrane-type separation unit may comprise a heat exchanger 40. The heat exchanger 40 may be operative to control a temperature in the purification unit 20. The heat exchanger is operatively disposed to selectively heat or cool at least a portion of the purification unit feed gas stream 21 by indirect heat transfer with a heat transfer medium. The heat transfer medium may be a heat transfer fluid.

The heat exchanger 40 may be in signal communication with the controller 80. The signal communication may be wireless or hard-wired. The controller 80 may be operable to control the membrane-type separation unit by adjusting the heat duty of the heat exchanger 40. Increasing the temperature of the stream entering the membrane-type separation unit decreases the flow rate of light noble gas in the light noble gas-depleted intermediate (non-permeate) stream. Decreasing the temperature of the stream entering the membrane-type separation unit increases the flow rate of light noble gas in the light noble gas-depleted intermediate (non-permeate) stream.

As shown in FIG. 1, the purification unit 20 may comprise a compressor 35 to compress the purification unit feed gas stream 21.

The purification unit 20 may be an adsorption-type separation unit.

The adsorption-type separation unit may comprise a plurality of vessels where each vessel contains a bed of adsorbent. The adsorption-type separation unit may comprise one or more control valves that control the fraction of the plurality of vessels that are on-stream. An adsorption bed is "on-stream" if it is undergoing an adsorption cycle to form the light noble gas-depleted intermediate stream and the light noble gas-rich product stream. An adsorption bed is "off-line" if it is idle while other adsorption beds in the system are undergoing an adsorption cycle. The one or more control valves may be in signal communication with the controller 80. The signal communication may be wireless or hard-wired.

The source of the second gas may be the first outlet of the purification unit. The controller 80 may be operable to control the flow rate of light noble gas from the first outlet of the purification unit to the second inlet of the gas mixer 60 by adjusting the fraction of the plurality of vessels on-stream. Increasing the fraction of the plurality of vessels on-stream decreases the flow rate of light noble gas in the light noble gas-depleted intermediate stream. Decreasing the fraction of the plurality of vessels on-stream increases the flow rate of light noble gas in the light noble gas-depleted intermediate stream.

The source of the second gas may be the first outlet of the purification unit where the purification unit 20 comprises a feed gas header and one or more adjustable orifices 32 operative to control a pressure in the feed gas header. The controller 80 may be operable to control the flow rate of light noble gas from the source of the second gas 17 to the second inlet of the gas mixer 60 by adjusting the one or more adjustable orifices 32 operative to control the pressure in the feed gas header of the purification unit 20. The one or more adjustable orifices 32 may be valves. Increasing the pressure in the feed gas header decreases the flow rate of light noble gas in the light noble gas-depleted intermediate stream. Decreasing the pressure in the feed gas header increases the flow rate of light noble gas in the light noble gas-depleted intermediate stream.

The source of the second gas may be the first outlet of the purification unit where the purification unit 20 comprises a tail gas header and one or more adjustable orifices 27 operative to control a pressure in the tail gas header. The controller 80 may be operable to control the flow rate of light noble gas from the source of the second gas 17 to the second inlet of the gas mixer 60 by adjusting the one or more adjustable orifices 27 to control the pressure in the tail gas header. The one or more adjustable orifices 27 may be valves. Increasing the pressure in the tail gas header increases the flow rate of light noble gas in the light noble gas-depleted intermediate stream. Decreasing the pressure in the tail gas header decreases the flow rate of light noble gas in the light noble gas-depleted intermediate stream.

The source of the second gas may comprise the second outlet of the purification unit where the purification unit 20 comprises a product gas header and one or more adjustable orifices 29 operative to control a pressure in the product gas header. The controller 80 may be operable to control the flow rate of light noble gas from the source of the second gas 17 to the second inlet of the gas mixer 60 by adjusting the one or more adjustable orifices 29 to control the pressure in the product gas header. Increasing the pressure in the product gas header decreases the flow rate of light noble gas in the light noble gas-depleted intermediate stream. Decreasing the pressure in the product gas header increases the flow rate of light noble gas in the light noble gas-depleted intermediate stream.

It is known in the art that temperature affects adsorption processes. For example, adsorption is exothermic and lower temperature increases capacity. Conversely, desorption is endothermic and therefore regenerating the bed is less effective at lower temperatures. These competing forces result in an optimum temperature for the working capacity of a given bed. Operating at a temperature in an adsorption-type separation unit closer to the optimum temperature for working capacity will result in a lower flow rate of light noble gas in the light noble gas-depleted intermediate stream compared to operating with a feed temperature further away from the optimum.

The purification unit 20 may be a rapid cycle adsorption unit. Any suitable apparatus for carrying out rapid cycle adsorption may be employed. Traditional switch valves are limited in their time to open and close and therefore unsuitable for rapid cycle adsorption processes. The associated piping volume for an adsorption process utilizing traditional switch valves is larger which reduces process efficiency as cycles become shorter. Rotary valves can move continuously and when properly designed have a smaller associated piping volume, overcoming the two limitations of traditional switch valves. A rotary-valve rapid cycle adsorption process may be carried out using a rotary-valve adsorption apparatus where the adsorption beds are positioned in a fixed bed assembly and are switched between adsorption steps by rotary feed and product valves that are known in the art. The rotary feed valve effectively replaces all valves corresponding to each bed on the feed side, and the rotary product valve effectively replaces all valves corresponding to each bed on the product side.

The rapid cycle adsorption process may be performed using a rotary-bed rapid cycle adsorption unit. For a rotary-bed rapid cycle adsorption apparatus the adsorption beds are placed in a rotor assembly that is positioned between first and second stator assemblies, each adsorption bed having a rotor port at either end of the bed via which gas can exit or enter the bed. Where the adsorption process involves countercurrent blowdown and purge steps, typically the first stator assembly comprises at least one feed port, at least one exhaust port and a first stator plate having at least one feed slot for directing at least one feed gas stream from the feed port(s) into any of the rotor ports that are in alignment with the slot and at least one exhaust slot for directing flow of exhaust gas streams from any of the rotor ports that are in alignment with the slot to the exhaust port(s), and the second stator assembly comprises at least one product port and a second stator plate having at least one product slot for directing flow of at least one product gas stream between the product port(s) and any of the rotor ports that are in alignment with the slot and at least one purge slot for directing flow of at least one purge gas into any of the rotor ports that are in alignment with the slot. The rotor assembly is rotated relative to the first and second stator assemblies so as to change the operating modes of individual adsorption beds by changing which rotor ports are in alignment with which slots in the first and second stator plates, wherein when the rotor ports of a bed are in alignment with a feed slot and/or a product slot that bed is in re-pressurization mode or feed mode, when the rotor ports of a bed are in alignment with an exhaust slot and a purge slot that bed is in purge mode, and when the rotor ports of a bed are in alignment with an exhaust slot and are not in alignment with a purge slot it is in blowdown mode.

A person of skill in the art will typically choose between a rotary bed and a rotary valve rapid cycle adsorption unit based on economics of scale and the number of beds required for a given separation. Smaller flow rates and more beds favors the rotary bed configuration and larger flow rates and fewer beds favors rotary valves with fixed beds.

The number of beds in the rapid cycle adsorption unit reflects a tradeoff between capital expenditure and process efficiency. For example, more beds may provide a higher recovery of light noble gas, but process economics will determine the upper bound on the number of beds. Overall recovery of the adsorption process is also higher for a greater light noble gas concentration in the feed. For the present application, in which high recovery is not needed and there is a relatively high concentration of light noble gas in the purification unit feed gas stream 21, the optimum number of beds is typically between 6 and 9 inclusive.

The adsorption cycle also includes a re-pressurization step in which the bed undergoing the re-pressurization step (i.e. the bed in re-pressurization mode) is re-pressurized, typically using feed gas and/or product gas, back to the pressure used for the feed step. Using product gas to re-pressurize will keep the adsorption sites clear of impurities at the expense of the overall system production rate. Using feed gas to re-pressurize will take up some of the adsorption sites with impurities, decreasing production capacity of the bed. Increasing the ratio of feed flow to product flow in the re-pressurization step causes an increase in the flow rate of light noble gas in the light noble gas-depleted intermediate stream by reducing the available adsorption sites in the bed, which in turn decreases the recovery of light gas.

The purification unit 20 may be a distillation-type separation unit.

The source of the second gas may be the first outlet of the purification unit 20 where the purification unit comprises one or more adjustable orifices 26, 27, 32 in signal communication with the controller 80 operative to control a pressure in the purification unit 20. The controller 80 may be operable to control the flow rate of light noble gas from the source of the second gas 17 to the second inlet of the gas mixer 60 by adjusting the one or more adjustable orifices 26, 27, 32 to control the pressure in the purification unit 20. Increasing the pressure in the distillation-type separation unit (i.e. a distillation column) increases the flow rate of light noble gas in the light noble gas-depleted intermediate stream. Decreasing the pressure in the distillation-type separation unit (i.e. a distillation column) decreases the flow rate of light noble gas in the light noble gas-depleted intermediate stream.

The source of the second gas may be the first outlet of the purification unit (20) where the apparatus further comprises a heat exchanger 40 in signal communication with the controller 80. The heat exchanger 40 may be operative to control a temperature in the purification unit. The controller 80 may be operable to control the flow rate of light noble gas from the source of the second gas 17 to the second inlet of the gas mixer (60) by adjusting the heat duty of the heat exchanger 40. Increasing the heat (temperature) from the heat exchanger increases the temperature in the distillation column which increases the flow rate of light noble gas in the light noble gas-depleted intermediate stream. Decreasing the heat (temperature) from the heat exchanger decreases the temperature in the distillation column which decreases the flow rate of light noble gas in the light noble gas-depleted intermediate stream.

The source of the second gas may be the first outlet of the purification unit 20 where the purification unit 20 comprises one or more orifices operative to control a reflux ratio in the purification unit 20. The controller 80 may be operable to control the flow rate of light noble gas from the source of the second gas 17 to the second inlet of the gas mixer 60 by adjusting the reflux ratio in the purification unit 20. The "reflux ratio" is defined as the molar flow rate of reflux, which is liquid flow to the top stage of the distillation column, divided by the molar flow rate of the vapor or overhead product (i.e. distillate withdrawn from the second outlet). Increasing the reflux ratio increases the flow rate of light noble gas in the light noble gas-depleted intermediate stream. Decreasing the reflux ratio decreases the flow rate of light noble gas in the light noble gas-depleted intermediate stream.

The source of the second gas may be the first outlet of the purification unit 20 where the purification unit 20 comprises one or more orifices operative to control a distillate to feed ratio in the purification unit 20. The controller 80 may be operable to control the flow rate of light noble gas from the source of the second gas 17 to the second inlet of the gas mixer 60 by adjusting the distillate to feed ratio in the purification unit 20. The "distillate to feed ratio" is defined as the molar flow rate of vapor or overhead product from the distillation column (i.e. distillate withdrawn from the second outlet), divided by the molar flow rate of feed fed to the distillation column. Increasing the distillate to feed ratio decreases the flow rate of light noble gas in the light noble gas-depleted intermediate stream. Decreasing the distillate to feed ratio increases the flow rate of light noble gas in the light noble gas-depleted intermediate stream.

The source of the second gas may be the first outlet of the purification unit (20) where the purification unit 20 comprises one or more orifices operative to control a boilup ratio in the purification unit 20. The controller 80 may be operable to control the flow rate of light noble gas from the source of the second gas 17 to the second inlet of the gas mixer 60 by adjusting the boilup to feed ratio in the purification unit 20. The "boilup ratio" is defined as the molar flow rate of boilup, which is the vapor flow rate to the bottom stage of the distillation column divided by the molar flow rate of the liquid or bottom product (i.e. bottoms stream withdrawn from the first outlet). Increasing the boilup ratio decreases the flow rate of light noble gas in the light noble gas-depleted intermediate stream. Decreasing the boilup ratio increases the flow rate of light noble gas in the light noble gas-depleted intermediate stream 23.

The feed gas stream 11 may be characterized by having a low concentration of light noble gas. The feed gas stream may have a molar concentration of light noble gas ranging from 0.1 mole % light noble gas to 2.0 mole % light noble gas, or ranging from 0.1 mole % light noble gas to 1.0 mole % light noble gas.

The present process comprises separating the combined gas stream 12 in an adsorption separation unit 10 to produce a light noble gas-enriched intermediate stream 13 and the tail gas stream 51. The adsorption separation unit 10 is an adsorption-type separation unit.

The cycle time of the adsorption cycle may be set to provide the light noble gas-enriched intermediate stream 13 having a bulk average ("mixing cup" average) light noble gas concentration ranging from 40 mole % to 90 mole % for the set cycle time. Contrary to conventional operation, the cycle time for the present process is extended to provide lower bulk average light noble gas concentrations for the light noble gas-enriched intermediate stream 13 leaving the adsorption separation unit 10. Operating the adsorption separation unit 10 with a longer cycle time increases the recovery of the light noble gas. Due to the low concentrations of light noble gas in the feed gas stream, high recovery is necessary to be commercially viable.

The present process comprises separating a purification unit feed gas stream 21 in a purification unit 20 to produce the light noble gas-rich product stream 25 and a light noble gas-depleted intermediate stream 23. The purification unit feed gas stream 21 comprises the light noble gas-enriched intermediate stream 13 from the adsorption separation unit 10. The purification unit 20 may be a membrane-type separation unit, an adsorption-type separation unit, or a distillation-type separation unit.

In the present process, the flow rate of the light noble gas in the second gas stream 17 is controlled responsive to a measure of the light noble gas content in at least one of the feed gas stream 11, the combined gas stream 12, or an adsorption vessel feed gas stream 15. The adsorption vessel feed gas stream 15 comprises at least a portion of the combined gas stream 12.

The light noble gas content may be expressed as a concentration or a relative amount in the stream.

The measure of the light noble gas content may be determined from a measurement of the light noble gas content. The measure of the light noble gas content may be expressed as a volume, molar, or mass concentration of the light noble gas. The measure of the light noble gas content may be expressed as a volume, molar, or mass fraction or percentage of the light noble gas in the mixture.

The measure of light noble gas content in the adsorption separation unit feed gas stream 15 may be the concentration of light noble gas in the feed gas stream 11.

The flow rate of the light noble gas in a stream may be expressed as a volumetric, molar, or mass flow rate.

Figure 6:
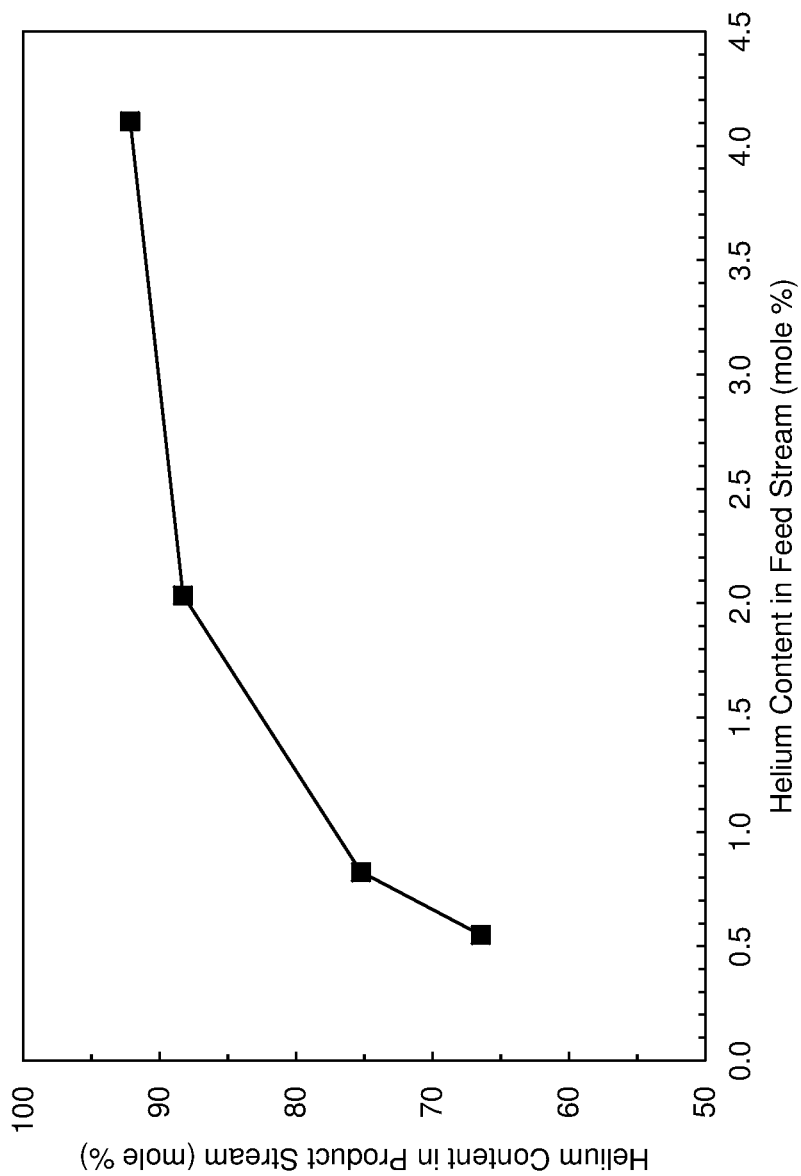
FIG. 6 is a plot of helium content in the product stream versus mole % helium in the feed gas stream.

The feed gas stream 11 may have a total gas molar flow rate, $F_1$, with an individual gas component molar flow rate of light noble gas, $F_{1, Noble}$. The second gas stream 17 may have a total gas molar flow rate, $F_2$, with an individual gas component molar flow rate of light noble gas, $F_{2, Noble}$. The process is characterized by recycling a greater molar flow rate of helium to the feed to the adsorption separation unit compared to processes described in the prior art. In the present process, $$\frac{F_{2, Noble}}{F_{1, Noble}}$$

where $F_{1, Noble}$ is the molar flow rate of light noble gas in the feed gas stream 11, and $F_{2, Noble}$ is the molar flow rate of light noble gas in the light noble gas-depleted intermediate stream 23. Recycling a higher molar flow rate of light noble gas from the purification unit 20 to the feed to the adsorption separation unit 10 maintains stable feed concentration to the adsorption separation unit 10. This enables the adsorption separation unit 10 to provide constant light noble gas-rich product gas to the purification unit 20, both in flow and concentration, which is necessary for final light noble gas product purity from the purification unit 20. FIG. 6 shows the effect of changing adsorption feed gas concentration on the adsorption unit product concentration.

For instance, if the feed concentration of helium in stream 11 were to drop from 2.0% to 0.5% over time, which is common in natural gases, the helium product purity of the adsorption unit 10 would decrease from 88% to 67%. This decrease in product purity is caused by the constraint of maintaining the adsorption unit recovery to maximize helium production. However, this decrease in helium product purity may lead to a decrease in the noble gas rich purity from the purification unit because it may not be possible to operate effectively at the lower purification unit helium concentration/purity.

In addition, recycling a higher molar flow rate of light noble gas from the purification unit 20 to the feed of the adsorption-type separation unit 10 increases the recovery of that unit. This effectively increases the overall recovery of the system as the adsorption-type unit 10 is the only significant source of helium losses.

The process may be characterized by $$\frac{F_{2, Noble}}{F_{1, Noble}} \geq 1,$$

The ratio of light noble gas molar flow rates, $$\frac{F_{2, Noble}}{F_{1, Noble}} \geq 1.$$

may be less than or equal to 16. At $$\frac{F_{2,Noble}}{F_{1,Noble}}$$

greater than 16, significant volumes of light noble gas are recycled to the adsorption separation unit 10, and at this point the benefit of recycling light noble gas deteriorates and there is no further practical enhancement of the adsorption-type separation unit 10.

Allie (U.S. Pat. No. 8,268,047) provides an example for helium purification with two VPSA in series with a first outlet stream returned to the adsorption separation unit. From the example the ratio of noble gas (helium) flow from the purification unit to the first divided by the noble gas flow in the feed $$\left(\frac{F_{2,Noble}}{F_{1,Noble}}\right)$$

is calculated as 0.528. In U.S. Pat. No. 5,080,694 by Knoblauch et al., a similar arrangement to Allie, of unit operations with recycle, is utilized again for helium purification. Per the values in Table 5 from example provided, $$\frac{F_{2,Noble}}{F_{1,Noble}}$$

of Knoblauch is calculated as 0.222. D'Amico et al. (U.S. Pat. No. 5,542,966) again utilizes the same arrangement as Allie and Knoblauch et al. for helium purification. The values provided in the example of D'Amico yield a $$\frac{F_{2,Noble}}{F_{1,Noble}}$$

ratio of 0.408. Finally, Choe et al. (U.S. Pat. No. 4,717,407) employ a process using an initial cryogenic distillation-type separation unit instead of an adsorption separation unit followed by a membrane as the purification unit, with a first outlet stream returned to the cryogenic distillation-type separation unit. In the second example using values in Table 4 for helium purification, $$\frac{F_{2,Noble}}{F_{1,Noble}}$$

of Choe is calculated as 0.077.

The flow rate of light noble gas in the second gas stream 17 may be increased if the light noble gas content is less than a desired lower limit.

The flow rate of light noble gas in the second gas stream 17 may be decreased if the light noble gas content is greater than a desired upper limit.

The desired lower limit for the light noble gas content of the combined gas stream 12 may correspond to a light noble gas mole fraction selected in a range from 0.1 mole % to 0.5 mole %. The desired upper limit for the light noble gas content of the combined gas stream 12 may correspond to a light noble gas mole fraction selected in a range from 1.0 mole % to 2 mole %.

The second gas stream 17 may comprise the light noble gas-depleted intermediate stream 23 from the purification unit 20. The light noble gas-depleted intermediate stream 23 may be compressed in compressor 45. The flow rate of light noble gas in the second stream 17 may be increased or decreased by controlling operating conditions of the purification unit 20 responsive to the measure of the light noble gas content.

The molar flow rate of light noble gas, $F_{2, Noble}$, in the light noble gas-depleted intermediate stream 23 may be increased or decreased in order to maintain the mole fraction of light noble gas in the combined gas stream 12 relatively constant in order to maintain operation within a desired light noble gas recovery range.

The second gas stream 17 may further comprise a portion 28 of the light noble gas-rich product stream 25. The flow rate of the light noble gas in the second gas stream 17 may be increased by increasing the flow rate of the portion 28 of the light noble gas-rich stream 25 and decreased by decreasing the flow rate of the portion 28 of the light noble gas-rich product stream 25.

The portion 28 may be a divided portion or a separated portion of the light noble gas-rich product stream 25.

In the process, the purification unit may be a membrane separation unit. The membrane separation unit separates a feed stream into a non-permeate stream and a permeate stream. The non-permeate stream is the light noble gas-depleted intermediate stream 23. The permeate stream is the light noble gas-rich product stream 25.

Controlling the operating conditions of the membrane separation unit may comprise increasing the flow rate of light noble gas in the light noble gas-depleted intermediate stream 23 by decreasing the pressure difference between the membrane separation unit feed gas stream and the light noble gas-rich product stream. Controlling the operating conditions of the membrane separation unit may comprise decreasing the flow rate of light noble gas in the light noble gas-depleted intermediate stream by increasing the pressure difference between the membrane separation unit feed gas stream and the light noble gas-rich product stream.

The membrane separation unit may comprise a plurality of membrane modules. Controlling the operating conditions of the membrane separation unit may comprise increasing the flow rate of light noble gas in the light noble gas-depleted intermediate stream 23 by decreasing the number of membrane modules on-stream. Controlling the operating conditions of the membrane separation unit may comprise decreasing the flow rate of light noble gas in the light noble gas-depleted intermediate stream 23 by increasing the number of membrane modules on-stream.

As discussed above, the apparatus may comprise a heat exchanger 40. The operating conditions of the membrane separation unit 20 may be controlled by increasing or decreasing the temperature of the membrane separation unit feed gas stream 21 in a heat exchanger.

Controlling the operating conditions of the membrane separation unit may comprise increasing the temperature of the membrane separation unit feed gas stream 21 to decrease the flow rate of light noble gas, $F_{2, Noble}$, in the light noble gas-depleted intermediate stream 23. Controlling the operating conditions of the membrane separation unit may comprise decreasing the temperature of the membrane separation unit feed gas stream 21 to increase the flow rate of light noble gas, $F_{2, Noble}$, in the light noble gas-depleted intermediate stream 23.

In the process, the purification unit 20 may be an adsorption-type separation unit. The adsorption-type separation unit separates a feed stream into a tail gas stream and a product stream. The tail gas stream is the light noble gas-depleted intermediate stream 23. The product stream is the light noble gas-rich product stream 25.

The adsorption-type separation unit may operate with an adsorption cycle having a cycle time. Controlling the operating conditions of the purification unit 20 may comprise increasing the cycle time of the purification unit 20 to decrease the flow rate of light noble gas in the light noble gas-depleted intermediate stream 23, and/or decreasing the cycle time of the purification unit 20 to increase the flow rate of light noble gas in the light noble gas-depleted intermediate stream 23. When the cycle time is increased, the capacity during production step for the more adsorbable species increases, due to the improved efficiency of removing the more adsorbable species over longer tail gas generation step times. By improving the capacity for the more adsorbable species, less of the desirable, less adsorbable species (light noble gas) is captured and lost during the steps which produce tail gas.

The adsorption-type separation unit may have a feed gas header, and controlling the operating conditions of the purification unit 20 may comprise increasing the pressure of the purification unit feed gas stream 21 in the feed gas header of the purification unit 20 to decrease the flow rate of the light noble gas in the light noble gas-depleted intermediate stream 23, and/or decreasing the pressure of the purification unit feed gas stream 21 in the feed gas header of the purification unit 20 to increase the flow rate of the light noble gas in the light noble gas-depleted intermediate stream 23. When the feed pressure is increased, the capacity during the production step for the more adsorbable species increases, due to the improved efficiency of the adsorbent at higher pressures to adsorb more adsorbable species. By improving the capacity for the more adsorbable species, less of the desirable, less adsorbable species (light noble gas) is captured and lost during the steps which produce tail gas.

The adsorption-type separation unit may have a tail gas header, and controlling the operating conditions of the purification unit 20 may comprise increasing the pressure of the light noble gas-depleted intermediate stream 23 in the tail gas header of the purification unit 20 to increase the flow rate of the light noble gas in the light noble gas-depleted intermediate stream 23, and/or decreasing the pressure of the light noble gas-depleted intermediate stream 23 in the tail gas header of the purification unit 20 to decrease the flow rate of the light noble gas in the light noble gas-depleted intermediate stream 23. When the pressure of the light noble gas-depleted intermediate stream 23 is increased, the capacity during the production step for the ore adsorbable species decreases, due to the lower quantity of the more adsorbable species being removed during the tail gas generating steps. By decreasing the capacity for the more adsorbable species, more of the desirable, less adsorbable species (light noble gas) is captured and lost during the steps which produce tail gas.

The adsorption-type separation unit may operate with an adsorption cycle comprising a blowdown step having a target pressure for the end of the blowdown step, where a blowdown gas stream is formed during the blowdown step. The blowdown gas may be compressed to form a rinse gas stream and/or the blowdown gas may be passed to the tail gas header. Controlling the operating conditions of the purification unit 20 may comprise increasing the target pressure for the end of the blowdown step to increase the flow rate of the light noble gas in the light noble gas-depleted intermediate stream 23, and/or decreasing the target pressure for the end of the blowdown step to decrease the flow rate of the light noble gas in the light noble gas-depleted intermediate stream 23. For the case where the blowdown gas is compressed to form a rinse gas stream, increasing the target pressure for the end of the blowdown step results in less of the light noble gas being removed, captured, and returned to the adsorbent bed on the production step via the rinse step. Therefore, more of the light noble gas remains in the bed for the following step(s) that generate tail gas (evacuation and/or purge), so this increases the amount of light noble gas in the noble gas depleted stream.

The adsorption-type separation unit may comprise a plurality of adsorption beds and operate with a plurality of adsorption cycles each comprising a feed step. Controlling the operating conditions of the purification unit 20 may comprise changing to an adsorption cycle having fewer adsorption beds simultaneously on the feed step to increase the flow rate of light noble gas in the light noble gas-depleted intermediate stream 23, and/or changing to an adsorption cycle having a greater number of adsorption beds simultaneously on the feed step to increase the flow rate of light noble gas in the light noble gas-depleted intermediate stream 23. When the number of adsorption beds simultaneously on the feed step is decreased, the capacity during the production step for the more adsorbable species decreases, due to the decreased volume of adsorbent available on the feed/production step. By decreasing the capacity for more adsorbable species, more of the desirable, less adsorbable species (light noble gas) is captured and lost during the steps which produce tail gas.

The adsorption-type separation unit may comprise a plurality of adsorption beds and operate with a plurality of adsorption cycles some comprising a pressure equalization step. Controlling the operating conditions of the purification unit 20 may comprise changing to an adsorption cycle having fewer or no pressure equalization steps to increase the flow rate of light noble gas in the light noble gas-depleted intermediate stream 23, and/or changing to an adsorption cycle having a greater number of pressure equalization steps to decrease the flow rate of light noble gas in the light noble gas-depleted intermediate stream 23. When the number of pressure equalizations is decreased, the capacity during the production step for the more adsorbable species decreases, due to the decreased efficiency of removing the more adsorbable species during the pressure equalization steps. By decreasing the capacity for the more adsorbable species, more of the desirable, less adsorbable species (light noble gas) is captured and lost during the steps that produce tail gas.

In the process, the purification unit 20 may be a distillation-type separation unit. The distillation-type separation unit separates a feed stream into a bottoms stream and an overhead or distillate stream. The bottoms stream is the light noble gas-depleted intermediate stream 23. The overhead or distillate stream is the light noble gas-rich product stream 25.

The distillation-type separation unit may operate at an operating pressure. Controlling the operating conditions of the purification unit 20 may comprise decreasing the operating pressure of the purification unit 20 to increase the flow rate of light noble gas in the light noble gas-depleted intermediate stream 23, and/or increasing the operating pressure of the purification unit 20 to decrease the flow rate of light noble gas in the light noble gas-depleted intermediate stream 23. When the operating pressure is increased, the solubility of the light noble gas in the bottoms stream is increased, which increases the flow rate of the light noble gas in the light noble gas-depleted intermediate stream.

The distillation-type separation unit may operate at an operating temperature. Controlling the operating conditions of the purification unit 20 may comprise decreasing the operating temperature of the purification unit 20 to increase the flow rate of light noble gas in the light noble gas-depleted intermediate stream 23, and/or increasing the operating temperature of the purification unit 20 to decrease the flow rate of light noble gas in the light noble gas-depleted intermediate stream 23. When the temperature is increased, the solubility of the light noble gas in the bottoms stream is increased, which increases the flow rate of the light noble gas in the light noble gas-depleted intermediate stream.

The distillation-type separation unit may operate with a reflux ratio. Controlling the operating conditions of the purification unit 20 may comprise increasing the reflux ratio of the purification unit 20 to increase the flow rate of light noble gas in the light noble gas-depleted intermediate stream 23, and/or decreasing the reflux ratio of the purification unit 20 to decrease the flow rate of light noble gas in the light noble gas-depleted intermediate stream 23. When the reflux ratio is increased, the amount of reflux flow is increased in relation to the amount of overhead or distillate flow, which 'washes' more light noble gas into liquid solution in the distillation-type separation unit and therefore the bottoms stream, thereby increasing light noble gas-depleted intermediate stream flow.

The distillation-type separation unit may operate with a distillate to feed ratio. Controlling the operating conditions of the purification unit 20 may comprise increasing the distillate to feed ratio of the purification unit 20 to decrease the flow rate of light noble gas in the light noble gas-depleted intermediate stream 23, and/or decreasing the distillate to feed ratio of the purification unit 20 to increase the flow rate of light noble gas in the light noble gas-depleted intermediate stream 23. When the distillate to feed ratio is increased, the amount of distillate flow is increased in relation to the amount of feed flow, which decreases the amount/quantity of light noble gas in the distillation-type separation unit and therefore the bottoms stream, thereby decreasing light noble gas-depleted intermediate stream flow.

The distillation-type separation unit may operate with a boilup ratio. Controlling the operating conditions of the purification unit 20 may comprise increasing the boilup ratio of the purification unit 20 to decrease the flow rate of light noble gas in the light noble gas-depleted intermediate stream 23, and/or decreasing the boilup ratio of the purification unit 20 to increase the flow rate of light noble gas in the light noble gas-depleted intermediate stream 23. When the boilup ratio is increased, the amount of vapor flow to the bottom stage is increased in relation to the amount of bottoms flow, which evaporates the light noble gas from the bottoms stream, thereby decreasing light noble gas-depleted intermediate stream flow.

The term "reflux ratio" is a standard term in the distillation art and is the ratio of reflux flow rate to overhead or distillate flow rate. The term "distillate to feed ratio" is a standard term in the distillation art and is the ratio of distillate flow rate to feed flow rate. The term "boilup ratio" is a standard term in the distillation art and is the ratio of boilup or vapor to the bottom stage flow rate to bottoms flow rate.

Any required pretreatment of gaseous feed mixtures to the various separation units, or post-treatment of any of the product streams can be employed with this process and apparatus, as required or desired. For example, depending upon the choice of the adsorbents used, a pretreatment to remove certain components from the feed gas stream 11 which might have an adverse effect on the adsorbent or process may be required. Similarly, it is possible to have components in the final helium product, i.e. the helium-rich permeate stream 25, which may be undesirable in the subsequent use of this product stream and must be removed in a post-treatment operation prior to its use.

Figure 8:
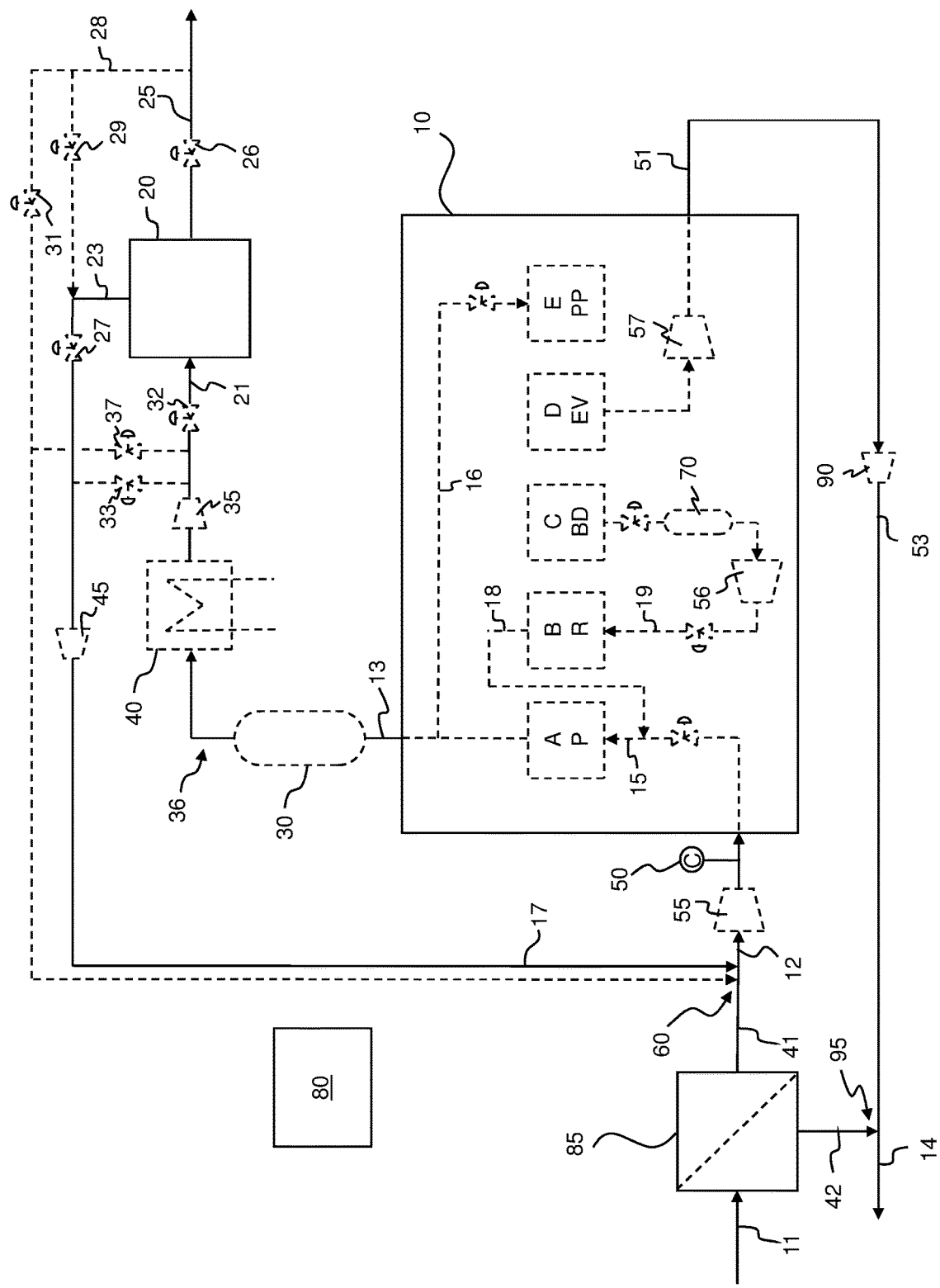
FIG. 8 is a process flow diagram for a light noble gas recovery process incorporating a feed membrane separation unit according to the present process and apparatus.

The embodiment of the present invention shown in FIG. 8 first separates the feed gas stream 11 in a feed membrane separation unit 85. The feed membrane separation unit may be any separation unit that separates a feed stream into two streams using a membrane, each resulting stream having a different concentration of species. The membrane can be a semipermeable membrane or a selectively permeable membrane. Membranes separate gas mixtures by allowing certain gas species to pass through the membrane by diffusion, facilitated diffusion, passive transport, and/or active transport.

The membrane separation unit can be any membrane device with some selectivity for separating the light noble gas from the other components in the feed when a pressure differential is maintained across the membrane. When the light noble gas is helium, the helium permeability through the membrane is typically greater than that of the other components present in the feed to the membrane. Consequently, the concentration of helium in the non-permeate stream from the membrane separation unit is less than its concentration in the feed stream entering the membrane separation unit. In FIG. 8, the feed gas 11 is separated into a permeate stream 41 that is enriched in light noble gas relative to the feed and a non-permeate stream 42 that is depleted in light noble gas relative to the feed.

The feed membrane separation unit 85 may consist of a single membrane device or, alternatively, several membrane devices configured and operated so as to achieve the separation in the most efficient manner, e.g., a cascade of membranes with internal recycle streams between various stages of the membrane unit. Typically, the membrane devices are manufactured in modules, each having certain semi-permeable membrane areas for permeation. The membrane materials may also be selected from the list of materials discussed for the membrane-type separation unit, or any other material that has a faster permeation rate for some compounds such as helium and a slower permeation rate for some compounds such as methane.

Permeate stream 41 combines with second gas stream 17, which is recycled from a downstream processing step, to form combined gas stream 12. The combined gas may then enter compressor 55 if needed before feeding the adsorption separation unit 10. The permeate stream 41 may be combined with the second gas stream 17 in gas mixer 60. As in FIG. 1, the combined gas stream 12 may be compressed in compressor 55 if necessary to feed the adsorption separation unit 10, which separates the stream into light noble gas-enriched intermediate stream 13 and a tail gas stream 51 depleted in light noble gas relative to the combined gas stream 12.

The light noble gas-enriched intermediate stream 13, if necessary, may be heated or cooled in heat exchanger 40, pressurized in compressor 35, or depressurized in adjustable orifice 32, to form purification unit feed gas stream 21. The purification unit 20 separates purification unit feed gas stream 21 into a light noble gas-rich product stream 25 and a light noble gas-depleted intermediate stream 23.

The second gas stream 17 may comprise the light noble gas-depleted intermediate stream 23 which may be compressed in compressor 45 if necessary to match the pressure of permeate stream 41. The second gas stream 17 may further comprise a portion 28 of the light noble gas-rich product stream 25. Portion 28 may be a divided portion or a separated portion of stream 25.

In the present process, the flow rate of the light noble gas in the second gas stream 17 is controlled responsive to a measure of the light noble gas content in at least one of the feed gas stream 11, the permeate stream 41, the combined gas stream 12, or an adsorption vessel feed gas stream 15. The adsorption vessel feed gas stream 15 comprises at least a portion of the combined gas stream 12.

Because the feed membrane 85 enriches the light noble gas content of the permeate stream 41 compared to that of feed gas 11, the desired upper limit for the light noble gas mole fraction of the combined gas stream 12 will be higher than the upper limit in the embodiment shown in FIG. 1. In the embodiment shown in FIG. 8, the desired upper limit for the light noble gas fraction of the combined gas stream 12 may range from 5 mole % to 20 mole %.

The present process may comprise the combination of the tail gas stream 51 and the non-permeate stream 42 to form a light noble gas-lean product stream 14. For example, if the feed gas 11 is rich in methane, then stream 14 may be returned to a pipeline or combusted for heat and/or power. If the tail gas stream 51 is at a lower pressure than non-permeate 42, then stream 51 may be compressed in tail gas compressor 90 to form compressed tail gas stream 53. The compressed tail gas stream 53 may be combined with non-permeate 42 in gas mixer 95 to form the light noble gas-lean product stream 14.

EXAMPLES

Example 1

A multiple-bed adsorption pilot unit/experimental apparatus was set up to gather light noble gas recovery data for an adsorption separation unit. The unit consisted of 5 adsorption beds, each 2.21 cm (0.87 in.) inside diameter by 3.05 m (10 ft.) in length. The adsorption cycle utilized is shown in FIG. 2, which is a 5-bed vacuum swing adsorption (VSA) with a rinse step (described above). The beds were filled with activated carbon adsorbent and the cycle time onstream varied between 30 seconds, 60 seconds, and 120 seconds. The feed composition to the unit was varied between 0.35 mole % He to 4 mole % He with nitrogen, methane, and carbon dioxide making up the balance of the feed gas. The feed pressure was varied between 345 kPa (absolute) and 1029 kPa (absolute) and the feed temperature was 21.1° C. (70° F.). The optional buffer tank 30 was included in the experimental set up and product purity was measured at the outlet from this tank, which is equivalent to purification unit inlet stream 21 in FIG. 1.

Figure 4:
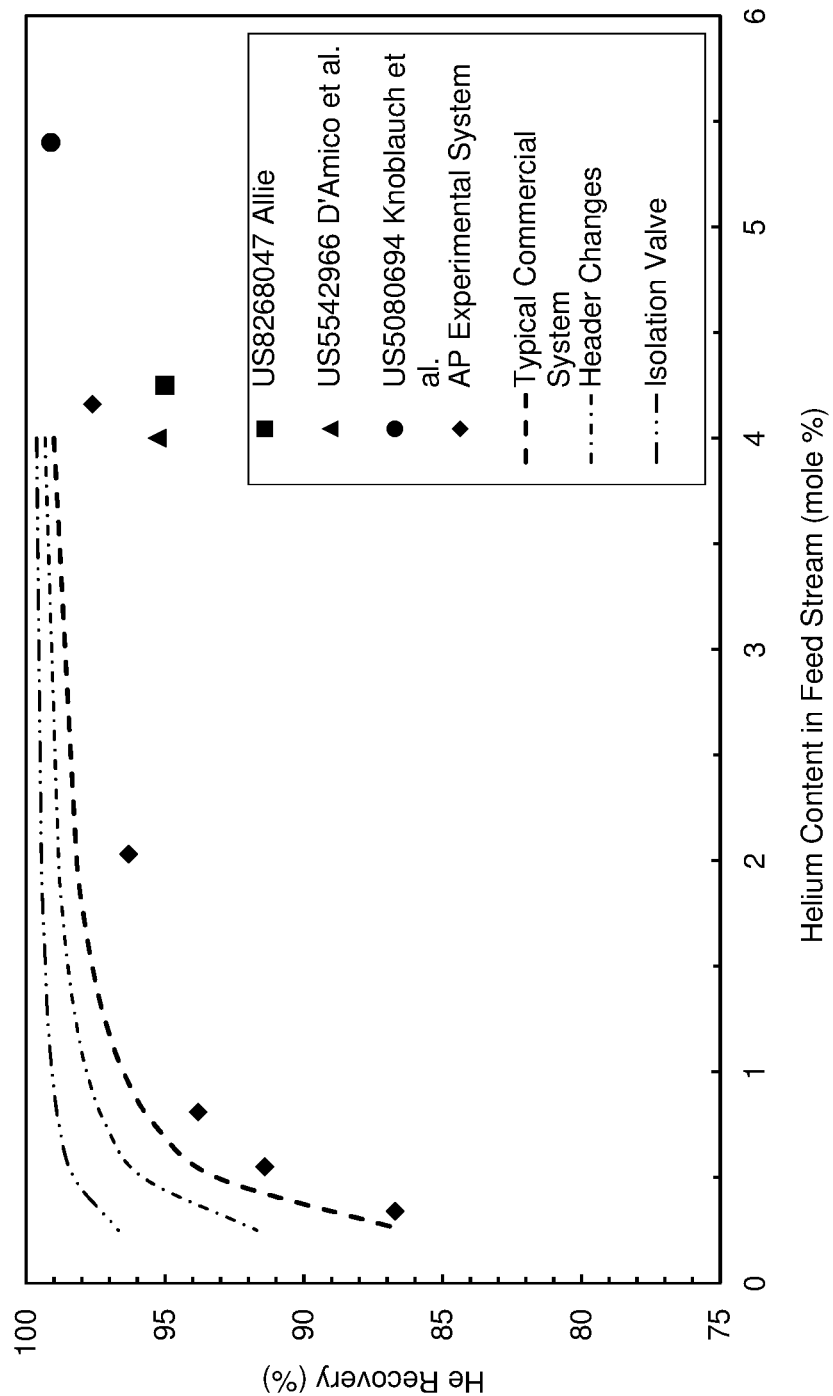
FIG. 4 is a plot of helium recovery versus % helium in the feed gas.

In the first experiment, varying amounts/concentrations of helium were fed to the experimental apparatus and the overall helium recovery was measured. The curve titled "AP Experimental System" in FIG. 4 shows the results of varying feed helium mole % to the adsorption unit with 70 mole % helium product purity and a 1:1 Rinse to Feed ratio for all data points on said curve. From FIG. 4, it can be seen that operating on the right side (higher helium feed gas concentrations) of FIG. 4 is more beneficial to overall system helium recovery. In practice, the feed gas helium concentration in stream 11 of FIG. 1 varies and declines with time.

Therefore, maintaining the helium concentration to the adsorption unit brings value and benefit. Higher helium concentration to the adsorption unit could be achieved by recycling helium from a second downstream separation unit. However, recycling helium from a second downstream separation unit is counter-intuitive because the (first) adsorption separation unit is the only source of helium losses, leading to lower helium recovery. But if helium recovery from the (first) adsorption separation unit could be improved to the point where benefits of additional helium feed concentration outweigh the helium losses, this would provide non-obvious benefits.

Figure 5:
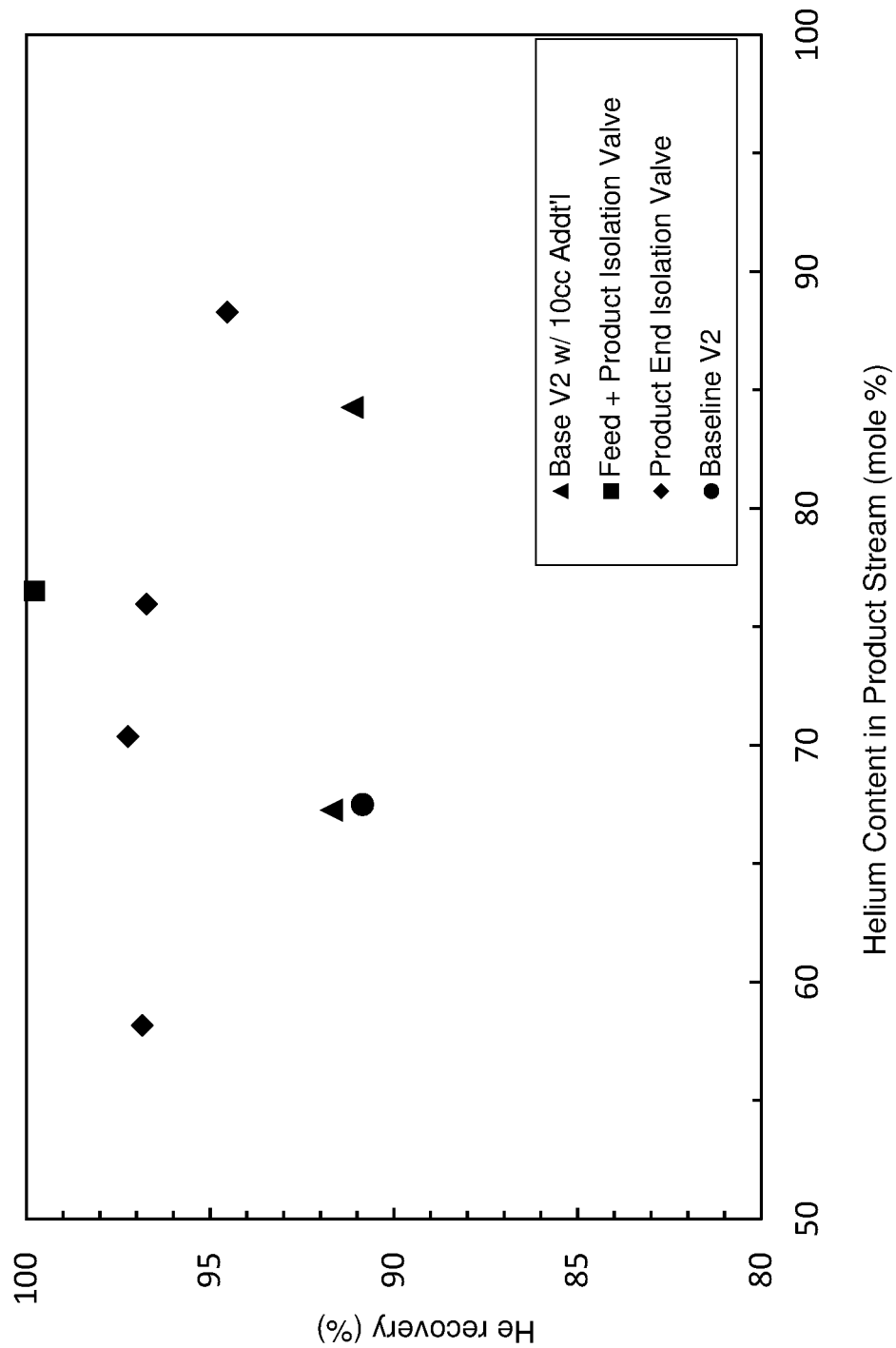
FIG. 5 is a plot of helium recovery versus helium content in the product stream.

In another set of experiments, the experimental system was operated with varying secondary volume, $V_2$. FIG. 5 shows experimental results of the adsorption-type system in the present invention on helium recovery as a function of varying secondary volume. Data in FIG. 5 is with 2 mole % helium in the feed and a 1:1 Rinse to Feed ratio. Rinse to Feed ratio is a measure of the molar flow of gas (stream 18 FIG. 1) taken from the bed during the Rinse step divided by the molar flow of combined gas (stream 12 in FIG. 1) gas sent to the bed in the Feed step. This ratio is monitored and controlled by the pressure in the bed at the end of the Blowdown step. In the experimental system, this was performed by adding isolation valves to the feed and product end of the column/bed, effectively reducing secondary volume. From the FIG. 5, it is clear that decreasing secondary volume will increase helium recovery.

From the experimental results, another unexpected benefit to maintaining helium concentration in the combined gas (stream 12 in FIG. 1) is observed, which is illustrated in FIG. 6. As the helium concentration in the combined gas (stream 12 in FIG. 1) declines, the helium product purity from the adsorption unit (stream 21 in FIG. 1) also declines. Since the feed concentration is known to vary and decline with time, this variation with product purity of the second unit inlet stream 21 may lead to difficulty controlling the purification unit. Additionally, since there is a finite/practice design basis for the purification unit, these variations could lead to a decline of light noble gas-rich product stream 25. Decline of the light noble gas-rich product stream 25 below the required purity for light noble gas might force the unit to be significantly turned down or potentially shut down.

Example 2

The present invention aims to maximize light noble gas recovery while handling varying and low concentrations of light noble gas in the feed by recycling a second stream rich in light noble gas to enrich the light noble gas content in the feed to the adsorption separation unit. From the findings in the experimental system, there has been an intentional effort to maximize helium recovery over the prior art by decreasing the secondary volumes of the adsorption unit. The curve titled "Header Changes" in FIG. 4 shows the impact from simulation modeling of reducing the secondary volumes by 50% over a typical commercial system by re-arranging and/or minimizing piping volumes.

The curve titled "Isolation Valve" in FIG. 4 employs an isolation switch valve in fluid communication with the bed at feed and product end of the adsorbent bed. This significantly reduces the secondary volume over the "Header Change" and "Commercial System", which in turn improves the adsorption and overall system helium recovery. The isolation valve on the product header opens during Production (P), Rinse (R), and Product Pressurization (PP) but closes during Blowdown (BD) and Evac (E). The isolation on the feed header closes during Product Pressurization (PP) and is open during all other adsorption steps to prevent gas having high helium concentrations from entering the secondary volumes on the feed end of the bed.

By reducing the secondary volume by header changes or isolation valves, the helium recovery at all combined gas stream 12 concentrations is significantly improved over the prior art and enables the present invention to achieve higher recovery across the whole range of helium concentration of interest (0.1% to 4%), as shown in FIG. 4.

Example 3

Greater benefits are seen in the case when the helium content of the incoming feed gas stream 11 drops from 4% to 0.5% over time. The prior art in this example is U.S. Pat. No. 8,268,047, a double VPSA for helium recovery. This change in the helium content of the feed gas stream 11 will cause a decrease in the helium purity of the adsorption unit enriched gas stream 13 as shown in FIG. 6.

Due to the lower incoming purity to the second stage inlet, the prior art, given a fixed system already in operation, would have to 'short cycle' (well known to someone skilled in the art of adsorption) the final purification stage to maintain final helium purity. This inherently increases the second stream helium flow ($F_{2,\ Noble}$) which leads to an increased helium loss as evidenced on the curve titled "Prior Art" in the FIG. 7.

In the current invention, due to the minimization of secondary volume in the adsorption separation unit, the adsorption separation unit recovery is implicitly higher, which enables the ability to actively increase the $$\frac{F_{2,Noble}}{F_{1,Noble}} \geq 1$$

as the feed content drops.

Figure 7:
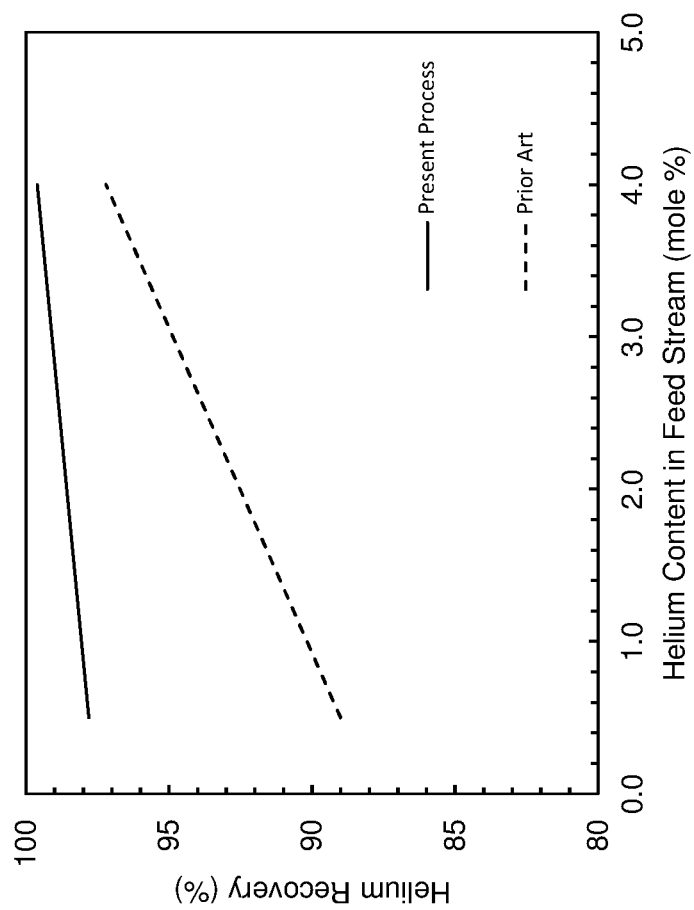
FIG. 7 shows plots of helium recovery versus % helium in the feed gas stream.

This yields a significant improvement in helium recovery compared to the Prior Art as the feed content drops, as shown in FIG. 7.

Example 4

The present invention may be used to extract and purify helium from a boil off gas (BOG) fuel stream coming from the storage tanks in a liquefied natural gas (LNG) export facility. BOG is ideal for processing using the present invention due to the very low concentrations of contaminants including water vapor, acid gases such as CO2 and H2S, and/or heavy hydrocarbons, which are removed upstream by the LNG facility. Furthermore, the helium content of BOG is concentrated above the typical levels found in natural gas by the LNG process. This example describes the extraction of helium from a BOG stream that is highly variable in both flow rate and helium concentration due to the changes in operating modes of the LNG facility. Many LNG facilities have multiple parallel trains. This allows the manipulation of the number of trains in operation, the number of LNG storage tanks in operation, and the number of ships being loaded to create distinct operating modes. All these factors impact the flow rate of the BOG and concentration of helium contained. Once the BOG exits the LNG storage tanks, it is typically compressed by the LNG facility and either combusted in a gas turbine or recycled to the front of the LNG facility. In this example, the compressed BOG stream enters the process shown in FIG. 8 as feed gas 11. The light noble gas-lean product stream 14 may be returned to the LNG facility BOG system with minimal pressure loss. The present invention has virtually no interaction with the upstream processes at the LNG facility which reduces any risk of upset in the present invention adversely affecting the larger LNG facility.

Tables 1 and 2 show example stream conditions for the extraction of helium from BOG for an LNG facility under two operating modes. Table 1 shows the "Normal Operating" mode, defined as having no ships being loaded and is the most frequent operating mode for the LNG facility. Table 2 details the "Ship Loading" mode, defined as when one or more ships are being loaded while maintaining LNG liquefaction train operation as well.

In comparison to during Normal Operating mode, the BOG feed stream 11 during Ship Loading mode has a higher flow rate with a lower helium concentration. Designing an integrated cryogenic distillation system for both modes would be extremely difficult due to constraints in both the heat exchange cooling duty as well as the flow rates in the distillation column. In contrast, the current invention is well suited for a feed stream with a widely varying flow rate. Given a constant feed pressure, the feed membrane separation unit 85 maintains a steady flow rate in permeate 41 across a wide range of inlet flow rates, which is achieved with a constant active area in the feed membrane separation unit 85. This effectively insulates downstream unit operations 10 and 20 from upstream changes in the flow rate of feed stream 11. Changes in the helium concentration in the BOG feed stream 11 are propagated to permeate stream 41, but the helium concentration in the combined gas stream 12 can then be controlled to maintain stable operation of the adsorption unit by changing operation of the purification unit 20 to control the molar flow rate of helium in second gas stream 17. Despite a 2.7-fold difference in molar flow rate of the feed gas 11, the combined stream 12 that feeds the adsorption separation unit 10 varies by less than 1%. A person skilled in the art will appreciate that both the design and operation of adsorption equipment and compressors downstream of the feed membrane unit 85 are significantly simplified when the flow rate is held approximately constant. In typical operation, if a feed gas to an adsorption unit had a molar flow rate that varied by 2.7 times, multiple trains of adsorption units would need to be employed. The present invention therefore is able to provide a steady flow rate to the adsorption separation unit 10, which allows for stable operation without the cost of additional equipment.

TABLE 1

| | Normal Operating Mode | | | | | |
|---|---|---|---|---|---|---|
| Stream | | 11 | 12 | 13 | 14 | 17 | 25 |
| Pressure | kPa_a | 5000 | 700 | 650 | 4980 | 700 | 500 |
| Temperature | ° C. | 40 | 38 | 40 | 38 | 40 | 38 |
| Flow | kmol/hr | 1250 | 320 | 40 | 1232 | 22 | 18 |
| Composition | | | | | | | |
| Methane (C1) | mol % | 87.5 | 75.5 | 0.0 | 88.9 | 0.0 | 0.0 |
| Nitrogen (N2) | mol % | 11.0 | 17.0 | 30.0 | 11.0 | 60.0 | 1.0 |
| Helium (He) | mol % | 1.5 | 7.5 | 70.0 | 0.1 | 40.0 | 99.0 |

TABLE 2

Ship Loading Mode

| Stream | | 11 | 12 | 13 | 14 | 17 | 25 |
|---|---|---|---|---|---|---|---|
| Pressure | kPa_a | 5000 | 700 | 650 | 4980 | 700 | 500 |
| Temperature | ° C. | 40 | 38 | 40 | 38 | 40 | 38 |
| Flow | kmol/hr | 3400 | 322 | 41 | 3386 | 27 | 14 |
| Composition | | | | | | | |
| Methane (C1) | mol % | 88.5 | 77.5 | 0.0 | 90.6 | 0.0 | 0.0 |
| Nitrogen (N2) | mol % | 11.0 | 15.0 | 30.0 | 9.2 | 60.0 | 1.0 |
| Helium (He) | mol % | 0.55 | 7.5 | 70.0 | 0.2 | 40.0 | 99.0 |

Example 5

Helium concentration in raw natural gas may vary from about 200 to about 600 ppm and still be of interest for application of the present invention to recover helium using a process corresponding to FIG. 8. The process economics for a helium content in the raw natural gas lower than about 200 ppm would probably be unattractive, and a helium content higher than about 600 ppm would likely justify the integration of helium recovery into the LNG process which would leave no helium in the BOG to recover.

Whereas Example 4 considers a case with 200 ppm in the raw natural gas entering the LNG process, Example 5 uses a case with 600 ppm helium in the raw natural gas. As shown in Table 3, the BOG that makes up stream 11 comprises 3.9% helium and the combined gas stream 12 comprises 17.5% helium. Note that the concentration of helium in the light noble gas-enriched intermediate 13 and the second gas stream 17 are unchanged. Examples 4 and 5 illustrate the most common range of helium concentrations to be expected in applications of the present invention as shown in FIG. 8.

TABLE 3

High Helium Natural Gas

| Stream | | 11 | 12 | 13 | 14 | 17 | 25 |
|---|---|---|---|---|---|---|---|
| Pressure | kPa_a | 5000 | 700 | 650 | 4980 | 700 | 500 |
| Temperature | ° C. | 40 | 38 | 40 | 38 | 40 | 38 |
| Flow | kmol/hr | 1300 | 403 | 107 | 1250 | 57 | 50 |
| Composition | | | | | | | |
| Methane (C1) | mol % | 85.6 | 64.2 | 0.0 | 88.9 | 0.0 | 0.0 |
| Nitrogen (N2) | mol % | 10.5 | 18.3 | 30.0 | 10.9 | 59.9 | 1.0 |
| Helium (He) | mol % | 3.9 | 17.5 | 70.0 | 0.2 | 40.1 | 99.0 |

We claim:

1. An apparatus for producing a light noble gas-rich product stream from a feed gas comprising a light noble gas and at least one other gaseous component, the light noble gas selected from the group consisting of helium and neon, the apparatus comprising:
   a feed membrane separation unit having an inlet for receiving a feed gas stream, a permeate outlet, and a non-permeate outlet;
   an adsorption separation unit, wherein the adsorption separation unit comprises a plurality of vessels each containing a bed of adsorbent;
   a feed gas header in selective fluid communication with each of the plurality of vessels;
   a product gas header in selective fluid communication with each of the plurality of vessels;
   a tail gas header in selective fluid communication with each of the plurality of vessels;
   process gas transfer lines operatively connecting the plurality of vessels to the feed gas header, the product gas header, and the tail gas header;
   each vessel of the plurality of vessels having process gas transfer lines associated therewith;
   a plurality of valves in the process gas transfer lines including a plurality of valves adjacent and associated with each respective vessel;
   wherein the adsorption separation unit has a central volume of process gas transfer lines associated with each of the respective vessels, Vc;
   wherein the central volume for each respective vessel is the sum of
   (i) the volume contained in the process gas transfer lines associated with the respective vessel connecting the respective vessel to each valve adjacent the respective vessel,
   (ii) all dead-end volumes, if any, connected at a junction to the respective vessel, and
   (iii) all dead-end volumes, if any, connected at a junction to any of the process gas transfer lines associated with the respective vessel that connect the respective vessel to any valve adjacent to the respective vessel;
   wherein the central volume for each respective vessel includes a secondary volume, V2, where the secondary volume is the sum of
   (i) the volume of all dead-end volumes, if any, connected to the respective vessel;
   (ii) the volume of all dead-end volumes, if any, connected at a junction to any of the process gas transfer lines associated with the respective vessel that connect the respective vessel to any valve adjacent the respective vessel, and
   (iii) the volume of any process gas transfer lines, if any, having a first end terminating in a valve adjacent the respective vessel that is configured to permit transfer of process gas to the tail gas header when open and having a second end terminating at a junction to any other of the associated process gas transfer lines that connect the respective vessel to any other valve adjacent to the respective vessel;
   wherein the secondary volume V2 is less than 5% of the central volume Vc for each vessel; and
   a conduit system for transferring a permeate stream from the permeate outlet to the feed gas header of the adsorption separation unit.

2. The apparatus according to claim 1 further comprising:
   a purification unit, the purification unit having an inlet, a first outlet, and a second outlet, the inlet in fluid communication with the product gas header of the adsorption separation unit;
   wherein the conduit system comprises a gas mixer having a first inlet for receiving the permeate stream, a second inlet in fluid communication with a source of a second gas having a higher light noble gas concentration than the permeate gas, and an outlet in fluid communication with a combined gas stream, wherein the feed gas header of the adsorption separation unit is in downstream fluid communication with the outlet of the gas mixer;
   a sensor in at least one of (i) a feed gas line supplying the inlet of the feed membrane separation unit, (ii) a permeate stream line connecting the permeate outlet of the feed membrane separation unit to the first inlet of the gas mixer, (iii) a combined gas stream line connecting the outlet of the gas mixer to the feed gas header of the adsorption separation unit, and (iv) the feed gas header; and a controller in signal communication with the sensor, the controller operable to control the flow rate of light noble gas from the source of the second gas to the second inlet of the gas mixer responsive to signals from the sensor.

3. The apparatus according to claim 2 wherein the source of the second gas comprises the first outlet of the purification unit.

4. The apparatus according to claim 2 wherein the source of the second gas comprises the second outlet of the purification unit.

5. The apparatus according to claim 2 wherein the source of the second gas comprises a process gas transfer line which operatively connects the product gas header to the inlet to the purification unit.

6. The apparatus according to claim 2 wherein the gas mixer has a third inlet in fluid communication with the second outlet of the purification unit.

7. The apparatus according to claim 2 wherein the gas mixer has a third inlet in fluid communication with a process gas transfer line which operatively connects the product gas header of the adsorption separation unit to the inlet to the purification unit.

8. The apparatus according to claim 2 wherein the purification unit is a membrane-type separation unit,
wherein the source of the second gas comprises the first outlet of the purification unit; and
wherein at least one of
(a) the purification unit comprises one or more adjustable orifices in signal communication with the controller, the one or more adjustable orifices operative to control a pressure in the purification unit; and
the controller is operable to control the flow rate of light noble gas from the source of the second gas to the second inlet of the gas mixer by adjusting the one or more adjustable orifices;
(b) the membrane-type separation unit comprises a plurality of membrane modules and one or more control valves that control the fraction of membrane modules on-stream, the one or more control valves in signal communication with the controller; and
the controller is operable to control the flow rate of light noble gas from the source of the second gas to the second inlet of the gas mixer by adjusting the fraction of membrane modules on-stream; or
(c) the apparatus comprises a heat exchanger operative to control a temperature in the purification unit, the heat exchanger in signal communication with the controller; and
the controller is operable to control the flow rate of light noble gas from the source of the second gas to the second inlet of the gas mixer by adjusting the heat duty of the heat exchanger.

9. The apparatus according to claim 2 wherein the purification unit is an adsorption-type separation unit,
wherein at least one of
(a) the source of the second gas comprises the first outlet of the purification unit;
the adsorption-type separation unit comprises a plurality of vessels each containing a bed of adsorbent, and one or more control valves that control the fraction of the plurality of vessels on-stream, the one or more control valves in signal communication with the controller; and
the controller is operable to control the flow rate of light noble gas from the source of the second gas to the second inlet of the gas mixer by adjusting the fraction of the plurality of vessels on-stream;
(b) the source of the second gas comprises the first outlet of the purification unit;
the purification unit comprises a feed gas header,
the purification unit comprises one or more adjustable orifices operative to control a pressure in the feed gas header of the purification unit; and
the controller is operable to control the flow rate of light noble gas from the source of the second gas to the second inlet of the gas mixer by adjusting the one or more adjustable orifices operative to control the pressure in the feed gas header of the purification unit;
(c) the source of the second gas comprises the first outlet of the purification unit;
the purification unit comprises a tail gas header,
the purification unit comprises one or more adjustable orifices operative to control a pressure in the tail gas header of the purification unit; and
the controller is operable to control the flow rate of light noble gas from the source of the second gas to the second inlet of the gas mixer by adjusting the one or more adjustable orifices operative to control the pressure in the tail gas header of the purification unit; or
(d) the source of the second gas comprises the second outlet of the purification unit;
the purification unit comprises a product gas header,
the purification unit comprises one or more adjustable orifices operative to control a pressure in the product gas header of the purification unit; and
the controller is operable to control the flow rate of light noble gas from the source of the second gas to the second inlet of the gas mixer by adjusting the one or more adjustable orifices operative to control the pressure in the product gas header of the purification unit; or
(e) the source of the second gas comprises the second outlet of the purification unit;
the apparatus comprises a heat exchanger operative to control a temperature in the purification unit, the heat exchanger in signal communication with the controller; and
the controller is operable to control the flow rate of light noble gas from the source of the second gas to the second inlet of the gas mixer by adjusting the heat duty of the heat exchanger.

10. The apparatus according to claim 9 wherein the purification unit is a rapid cycle type adsorption unit.

11. The apparatus according to claim 10 wherein the rapid cycle adsorption unit comprises one or more rotary valves.

12. The apparatus according to claim 10 wherein the rapid cycle adsorption unit comprises a rotor assembly and first and second stator assemblies, wherein:
the rotor assembly is positioned between the first and second stator assemblies and comprises a plurality of adsorption beds each bed having a rotor port at either end of the bed via which gas enters or exits said bed;
the first stator assembly comprises at least one feed port, at least one exhaust port and a first stator plate having at least one feed slot for directing at least one feed gas stream from the feed port(s) into any of the rotor ports that are in alignment with the slot and at least one exhaust slot for directing flow of exhaust gas streams from any of the rotor ports that are in alignment with the slot to the exhaust port(s); and the second stator assembly comprises at least one product port and a second stator plate having at least one product slot for directing flow of at least one product gas stream between the product(s) port and any of the rotor ports that are in alignment with the slot and at least one purge slot for directing flow of at least one purge gas stream into any of the rotor ports that are in alignment with the slot;

the rotor assembly being rotatable relative to the first and second stator assemblies so as to change the operating modes of individual adsorption beds by changing which rotor ports are in alignment with which slots in the first and second stator plates.

13. The apparatus according to claim 10 wherein the rapid cycle adsorption unit comprises 6 to 9 beds each comprising a bed of adsorbent.

14. The apparatus according to claim 2 wherein the purification unit is a distillation-type separation unit,
wherein the source of the second gas comprises the first outlet of the purification unit; and
wherein at least one of
(a) the purification unit comprises one or more adjustable orifices in signal communication with the controller, the one or more adjustable orifices operative to control a pressure in the purification unit; and
the controller is operable to control the flow rate of light noble gas from the source of the second gas to the second inlet of the gas mixer by adjusting the one or more adjustable orifices operative to control the pressure in the purification unit;
(b) the apparatus comprises a heat exchanger operative to control a temperature in the purification unit, the heat exchanger in signal communication with the controller; and
the controller is operable to control the flow rate of light noble gas from the source of the second gas to the second inlet of the gas mixer by adjusting the heat duty of the heat exchanger;
(c) the purification unit comprises one or more orifices operative to control a reflux ratio in the purification unit; and
the controller is operable to control the flow rate of light noble gas from the source of the second gas to the second inlet of the gas mixer by adjusting the reflux ratio in the purification unit;
(d) the purification unit comprises one or more orifices operative to control a distillate to feed ratio in the purification unit; and
the controller is operable to control the flow rate of light noble gas from the source of the second gas to the second inlet of the gas mixer by adjusting the distillate to feed ratio in the purification unit; or
(e) the purification unit comprises one or more orifices operative to control a product to feed ratio in the purification unit; and
the controller is operable to control the flow rate of light noble gas from the source of the second gas to the second inlet of the gas mixer by adjusting the distillate to feed ratio in the purification unit.

15. A process for separating a feed gas stream comprising a light noble gas and at least one other gaseous component into a light noble gas-rich product stream and a light noble gas-lean product stream, the light noble gas selected from the group consisting of helium and neon, the process comprising:

separating the feed gas stream in a feed membrane separation unit to produce a permeate stream and a non-permeate stream;
combining said permeate stream with a second gas stream to form a combined gas stream, the second gas stream having a higher light noble gas content than the permeate stream, the second gas stream having a flow rate that is regulated;
separating an adsorption separation unit feed gas stream in an adsorption separation unit to produce a light noble gas-enriched intermediate stream and a tail gas stream, wherein the light noble gas-lean product stream comprises at least a portion of the tail gas stream, wherein the adsorption separation unit feed gas stream comprises at least a portion of the combined gas stream; and
separating a purification unit feed gas stream in a purification unit to produce the light noble gas-rich product stream and a light noble gas-depleted intermediate stream, wherein the purification unit feed gas stream comprises at least a portion of the light noble gas-enriched intermediate stream from the adsorption separation unit;
wherein the flow rate of the light noble gas in the second gas stream is controlled responsive to a measure of the light noble gas content in at least one of the feed gas stream, the permeate stream, the combined gas stream, or the adsorption separation unit feed gas stream.

16. A process according to claim 15 wherein the adsorption separation unit comprises:
a plurality of vessels each containing a bed of adsorbent;
a feed gas header in selective fluid communication with each of the plurality of vessels;
a product gas header in selective fluid communication with each of the plurality of vessels;
a tail gas header in selective fluid communication with each of the plurality of vessels;
process gas transfer lines operatively connecting the plurality of vessels to the feed gas header, the product gas header, and the tail gas header;
each vessel of the plurality of vessels having process gas transfer lines associated therewith;
a plurality of valves in the process gas transfer lines including a plurality of valves adjacent and associated with each respective vessel;
wherein the adsorption separation unit has a central volume of process gas transfer lines associated with each of the respective vessels, $V_c$;
wherein the central volume for each respective vessel is the sum of
(i) the volume contained in the process gas transfer lines associated with the respective vessel connecting the respective vessel to each valve adjacent the respective vessel,
(ii) all dead-end volumes, if any, connected at a junction to the respective vessel, and
(iii) all dead-end volumes, if any, connected at a junction to any of the process gas transfer lines associated with the respective vessel that connect the respective vessel to any valve adjacent the respective vessel;
wherein the central volume for each respective vessel includes a secondary volume, $V_2$, where the secondary volume is the sum of
(i) the volume of all dead-end volumes, if any, connected to the respective vessel;
(ii) the volume of all dead-end volumes, if any, connected at a junction to any of the process gas transfer lines associated with the respective vessel that connect the respective vessel to any valve adjacent to the respective vessel, and (iii) the volume of any process gas transfer lines, if any, having a first end terminating in a valve adjacent the respective vessel that is configured to permit transfer of process gas to the tail gas header when open and having a second end terminating at a junction to any other of the associated process gas transfer lines (102) that connect the respective vessel to any other valve adjacent to the respective vessel; and wherein the secondary volume V2 is less than 5% of the central volume Vc for each vessel.

17. The process according to claim 15 wherein the permeate gas stream has a total gas molar flow rate, $F_1$, with a molar flow rate of light noble gas, $F_{1, Noble}$, and the second gas stream has a total gas molar flow rate, F2, with a molar flow rate of light noble gas, $F_{2, Noble}$, and wherein $$\frac{F_{2,Noble}}{F_{1,Noble}} \geq 1.$$

18. The process according to claim 15 wherein the flow rate of light noble gas in the second gas stream is increased if the light noble gas content is less than a desired lower limit; and/or the flow rate of light noble gas in the second gas stream is decreased if the light noble gas content is greater than a desired upper limit.

19. The process according to claim 15 wherein the second gas stream comprises the light noble gas-depleted intermediate stream, and wherein the flow rate of light noble gas in the second stream is increased or decreased by controlling operating conditions of the purification unit in response to the light noble gas content.

20. The process according to claim 19 wherein the purification unit is a membrane-type separation unit comprising a plurality of membrane modules and wherein controlling operating conditions of the purification unit comprises at least one of (a) decreasing the pressure difference between the purification unit feed gas stream and the light noble gas-rich product stream to increase the flow rate of light noble gas in the light noble gas-depleted intermediate stream; and/or increasing the pressure difference between the purification unit feed gas stream and the light noble gas-rich product stream to decrease the flow rate of light noble gas in the light noble gas-depleted intermediate stream;

(b) decreasing the number of membrane modules on-stream to increase the flow rate of light noble gas in the light noble gas-depleted intermediate stream; and/or increasing the number of membrane modules on-stream to decrease the flow rate of light noble gas in the light noble gas-depleted intermediate stream; or (c) increasing the temperature of the purification unit feed gas stream to decrease the flow rate of light noble gas in the light noble gas-depleted intermediate stream; and/or decreasing the temperature of the purification unit feed gas stream to increase the flow rate of light noble gas in the light noble gas-depleted intermediate stream.

21. The process according to claim 19 wherein the purification unit is an adsorption-type separation unit wherein at least one of the following control schemes are employed:

(a) the adsorption-type separation unit operates with an adsorption cycle having a cycle time and controlling the operating conditions of the purification unit comprises increasing the cycle time of the purification unit to decrease the flow rate of light noble gas in the light noble gas-depleted intermediate stream; and/or decreasing the cycle time of the purification unit to increase the flow rate of light noble gas in the light noble gas-depleted intermediate stream;

(b) the adsorption-type separation unit operates with an adsorption cycle comprising a purge step containing the light noble gas in the light noble gas-enriched intermediate stream and controlling the operating conditions of the purification unit comprises increasing the flow rate of the purge step to increase the flow rate of the light noble gas in the light noble gas-depleted intermediate stream; and/or decreasing the flow rate of the purge step to decrease the flow rate of the light noble gas in the light noble gas-depleted intermediate stream;

(c) the adsorption-type separation unit has a feed gas header and controlling the operating conditions of the purification unit comprises increasing the pressure of the purification unit feed gas stream in the feed gas header of the purification unit to decrease the flow rate of the light noble gas in the light noble gas-depleted intermediate stream; and/or decreasing the pressure of the purification unit feed gas stream in the feed gas header of the purification unit to increase the flow rate of the light noble gas in the light noble gas-depleted intermediate stream;

(d) the adsorption-type separation unit has a tail gas header and controlling the operating conditions of the purification unit comprises increasing the pressure of the light noble gas-depleted intermediate stream in the tail gas header of the purification unit to increase the flow rate of the light noble gas in the light noble gas-depleted intermediate stream; and/or decreasing the pressure of the light noble gas-depleted intermediate stream in the tail gas header of the purification unit to decrease the flow rate of the light noble gas in the light noble gas-depleted intermediate stream;

(e) the adsorption-type separation unit operates with an adsorption cycle comprising a blowdown step having a target pressure for the end of the blowdown step and controlling the operating conditions of the purification unit comprises increasing the target pressure for the end of the blowdown step to increase the flow rate of the light noble gas in the light noble gas-depleted intermediate stream; and/or decreasing the target pressure for the end of the blowdown step to decrease the flow rate of the light noble gas in the light noble gas-depleted intermediate stream;

(f) the adsorption-type separation unit comprises a plurality of adsorption beds and operates with a plurality of adsorption cycles each comprising a feed step and controlling the operating conditions of the purification unit comprises changing to an adsorption cycle having a lesser number of adsorption beds simultaneously on the feed step to increase the flow rate of light noble gas in the light noble gas-depleted intermediate stream; and/or changing to an adsorption cycle having a greater number of adsorption beds simultaneously on the feed step to increase the flow rate of light noble gas in the light noble gas-depleted intermediate stream; or (g) the adsorption-type separation unit comprises a plurality of adsorption beds and operates with a plurality of adsorption cycles some comprising a pressure equalization step and controlling the operating conditions of the purification unit comprises:

changing to an adsorption cycle having a lesser degree of pressure equalization by employing a lesser number of or no pressure equalization steps and/or reducing the total moles of gas transferred in one or more pressure equalization steps to increase the flow rate of light noble gas in the light noble gas-depleted intermediate stream;

and/or changing to an adsorption cycle having a greater degree of pressure equalization by employing a greater number of pressure equalization steps and/or increasing the total moles of gas transferred in one or more pressure equalization steps to decrease the flow rate of light noble gas in the light noble gas-depleted intermediate stream; or (h) the adsorption-type separation unit operates with cycle comprising a feed and product repressurization step and controlling the operating conditions of the purification unit comprises:

increasing the ratio of feed flow to product flow in the repressurization step to increase the flow rate of light noble gas in the light noble gas-depleted intermediate stream; and/or decreasing the ratio of feed flow to product flow in the repressurization step to decrease the flow rate of light noble gas in the light noble gas-depleted intermediate stream; or (i) the adsorption-type separation unit operates with cycle comprising a feed temperature and an optimum temperature to maximize working capacity and controlling the operating conditions of the purification unit comprises:

operating with the feed temperature closer to the optimum temperature to decrease the flow rate of light noble gas in the light noble gas-depleted intermediate stream; and/or operating with the feed temperature further away from the optimum temperature to increase the flow rate of light noble gas in the light noble gas-depleted intermediate stream.

22. The process according to claim 21 wherein the purification unit is a rapid cycle adsorption unit.

23. The process according to claim 22 wherein the rapid cycle adsorption unit comprises one or more rotary valves.

24. The process according to claim 22
wherein the rapid cycle adsorption unit comprises a rotor assembly and first and second stator assemblies, wherein:
the rotor assembly is positioned between the first and second stator assemblies and comprises a plurality of adsorption beds each bed having a rotor port at either end of the bed via which gas enters or exits said bed;
the first stator assembly comprises at least one feed port, at least one exhaust port and a first stator plate having at least one feed slot for directing at least one feed gas stream from the feed port(s) into any of the rotor ports that are in alignment with the slot and at least one exhaust slot for directing flow of exhaust gas streams from any of the rotor ports that are in alignment with the slot to the exhaust port(s); and
the second stator assembly comprises at least one product port and a second stator plate having at least one product slot for directing flow of at least one product gas stream between the product port(s) and any of the rotor ports that are in alignment with the slot and at least one purge slot for directing flow of at least one purge gas stream into any of the rotor ports that are in alignment with the at least one purge slot;
the rotor assembly being rotatable relative to the first and second stator assemblies so as to change the operating modes of individual adsorption beds by changing which rotor ports are in alignment with which slots in the first and second stator plates.

25. The process according to claim 22 wherein the rapid cycle adsorption unit comprises 6 to 9 beds each comprising a bed of adsorbent.

26. The process according to claim 19 wherein the purification unit is a distillation-type separation unit operating with a reflux ratio and at an operating pressure and an operating temperature, wherein controlling the operating conditions of the purification unit comprises at least one of (a) decreasing the operating pressure of the purification unit to increase the flow rate of light noble gas in the light noble gas-depleted intermediate stream; and/or increasing the operating pressure of the purification unit to decrease the flow rate of light noble gas in the light noble gas-depleted intermediate stream;

(b) increasing the reflux ratio of the purification unit to increase the flow rate of light noble gas in the light noble gas-depleted intermediate stream; and/or decreasing the reflux ratio of the purification unit to decrease the flow rate of light noble gas in the light noble gas-depleted intermediate stream; or (c) decreasing the operating temperature of the purification unit to increase the flow rate of light noble gas in the light noble gas-depleted intermediate stream; and/or increasing the operating temperature of the purification unit to decrease the flow rate of light noble gas in the light noble gas-depleted intermediate stream.

27. The process according to claim 15 wherein the second gas stream comprises a portion of the light noble gas-rich product stream having a flow rate, and the flow rate of the light noble gas in the second gas steam is increased by increasing the flow rate of the portion of the light noble gas-rich product stream and decreased by decreasing the flow rate of the portion of the light noble gas-rich product stream.

28. The process according to claim 15 wherein the feed gas stream has a molar concentration of light noble gas ranging from 0.1 mole % light noble gas to 2.0 mole % light noble gas.

* * * * *